United States Patent
Russell et al.

(10) Patent No.: US 12,072,413 B1
(45) Date of Patent: Aug. 27, 2024

(54) METHOD FOR WALL DETECTION AND LOCALIZATION

(71) Applicant: Amazon Technologies, Inc., Seattle, WA (US)

(72) Inventors: Spencer Russell, Quincy, MA (US); Krishna Kamath Koteshwara, Santa Clara, CA (US); Tarun Pruthi, Fremont, CA (US); Ali Abdollahzadeh Milani, Mountain View, CA (US); Trausti Thor Kristjansson, San Jose, CA (US); Anran Wang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 589 days.

(21) Appl. No.: 17/218,274

(22) Filed: Mar. 31, 2021

(51) Int. Cl.
*H04R 3/04* (2006.01)
*G01N 29/46* (2006.01)
(Continued)

(52) U.S. Cl.
CPC .......... *G01S 15/101* (2013.01); *G01N 29/46* (2013.01); *G01N 29/48* (2013.01); *H04R 3/04* (2013.01); *H04R 2430/23* (2013.01)

(58) Field of Classification Search
CPC ...... G01N 29/48; G01N 29/46; G01S 15/101; G01S 5/00; G01S 5/18; G01S 3/8083; H04R 3/04; H04R 2430/23
See application file for complete search history.

(56) References Cited

U.S. PATENT DOCUMENTS 9,294,860 B1 * 3/2016 Carlson ................. H04R 3/005
10,313,808 B1 * 6/2019 Ramprashad .......... G01S 7/536
(Continued)

FOREIGN PATENT DOCUMENTS

EP 1983799 A1 * 10/2008 ............. G01S 15/00

OTHER PUBLICATIONS

Antonacci et al. ("Inference of room geometry from acoustic impulse responses." IEEE Transactions on Audio, Speech, and Language Processing 20.10 (2012)) (Year: 2012).*
(Continued)

*Primary Examiner* — Hovhannes Baghdasaryan
*Assistant Examiner* — Christopher Richard Walker
(74) *Attorney, Agent, or Firm* — Pierce Atwood LLP

(57) ABSTRACT

A system that performs wall detection and localization to determine a position of a device relative to acoustically reflective surfaces. The device emits an audible sound including a frequency modulated signal and captures reflections of the audible sound. The frequency modulated signal enables the device to determine an amplitude of the reflections at different time-of-arrivals, which corresponds to a direction of the reflection. The device then performs beamforming to generate a 2D intensity map that represents an intensity of the reflections at each spatial location around the device. The device detects wall(s) in proximity to the device by identifying peak intensities represented in the 2D intensity map. In some examples, instead of performing beamforming, the device can perform directional wall detection by physically rotating the device and emitting the audible sound in multiple directions. The device may perform ultrasonic wall detection using ultrasonic sound frequencies.

20 Claims, 19 Drawing Sheets

(51) Int. Cl.
*G01N 29/48* (2006.01)
*G01S 15/02* (2006.01)
*G01S 15/10* (2006.01)

(56) References Cited

U.S. PATENT DOCUMENTS

| | | | |
|---|---|---|---|
| 10,580,429 B1* | 3/2020 | Karimian-Azari | G01S 3/808 |
| 2011/0317522 A1* | 12/2011 | Florencio | G01S 3/8006 367/129 |
| 2016/0277863 A1* | 9/2016 | Cahill | G01S 3/8083 |
| 2018/0132815 A1* | 5/2018 | Tsai | A61B 5/42 |

OTHER PUBLICATIONS

Pradhan et al. ("Smartphone-based Acoustic Indoor Space Mapping". Proc. ACM Interact. Mob. Wearable Ubiquitous Technol. 2, 2, Article 75 (Jun. 2018)) (Year: 2018).*

Shih and Rowe, ("Can a Phone Hear the Shape of a Room?," 2019 18th ACM/IEEE International Conference on Information Processing in Sensor Networks (IPSN), Montreal, QC, Canada, 2019, pp. 277-288) (Year: 2019).*

Antonacci et al. ("Geometric reconstruction of the environment from its response to multiple acoustic emissions," 2010 IEEE International Conference on Acoustics, Speech and Signal Processing, Dallas, TX, USA, 2010, pp. 2822-2825) (Year: 2010).*

Song et al., ("Room Geometry Reconstruction Based on Speech and Acoustic Image Methodology," 2019 IEEE International Conference on Smart Internet of Things (SmartIoT), Tianjin, China, 2019, pp. 113-120) (Year: 2019).*

Breazeal, et al., (2016) "Social Robotics," In: Siciliano B., Khatib O. (eds) Springer Handbook of Robotics, https://doi.org/10.1007/978-3-31932552-1_72, pp. 1935-1971.

Turing, "Computing Machinery and Intelligence," Mind Journal, Oct. 1950, vol. LIX. No. 236, (retrieved from https://academic.oup.com/mind/article/LIX/236/433/986238), pp. 433-460.

Smith et al., "The Development of Embodied Cognition: Six Lessons from Babies," 2005 Massachusetts Institute of Technonolgy, Artificial Life, vol. 11, pp. 13-29.

Chen et al., "UNITER: UNiversal Image-TExt Representation Learning," 2020 European Conference on Computer Vision, arXiv:1909.11740, pp. 1-26.

Brown et al., "Language Models are Few-Shot Learners, "(NeurIPS 2020), arXiv:2005.14165, pp. 1-25.

Breazeal, "Toward sociable robots," 2003, Robotics and Autonomous Systems, 42, pp. 167-175.

Greer, "Eight Ways to Help Improve Your Child's Vocabulary," https://lifehacker.com/eight-ways-to-help-improve-your-childs-vocabulary-1645796717, 2014, 9 pages.

Lan et al., "ALBERT: A Lite BERT for Self-Supervised Learning of Language Representations," International Conference on Learning Representations (ICLR 2020), arXiv:1909.11942, pp. 1-17.

Rajpurkar et al., "SQuAD: 100,000+ Questions for Machine Comprehension of Text," arXiv:1606.05250, 2016, 10 pages.

Gratch et al., "Can virtual humans be more engaging than real ones?", 12th International Conference on Human-Computer Interaction, Beijing, China, 2007, 10 pages.

Van Pinxteren et al., "Human-like communication in conversational agents: a literature review and research agenda," Journal of Service Management, vol. 31 No. 2, 2020, pp. 203-225.

Rasipuram et al., "Automatic multimodal assessment of soft skills in social interactions: a review," Multimedial Tools and Applications, 2020, 25 pages.

Price, "Ask Alexa or Google Home to Read your Child a Personalized Bedtime Story with this Skill," https://lifehacker.com/ask-alexa-or-google-home-to-read-your-child-a-personali-1829249795, 2018, 3 pages.

Briones, "How This Digital Avatar is Elevating AI Technology," ForbesLife, https://www.forbes.com/sites/isisbriones/2020/09/28/how-this-digital-avatar-is-elevating-ai-technology/?sh=696520a33a8a, 2020, 8 pages.

Zakharov et al., Few-Shot Adversarial Learning of Realistic Neural Talking Head Models, arXiv:1905.08233, 2019, pp. 1-21.

* cited by examiner

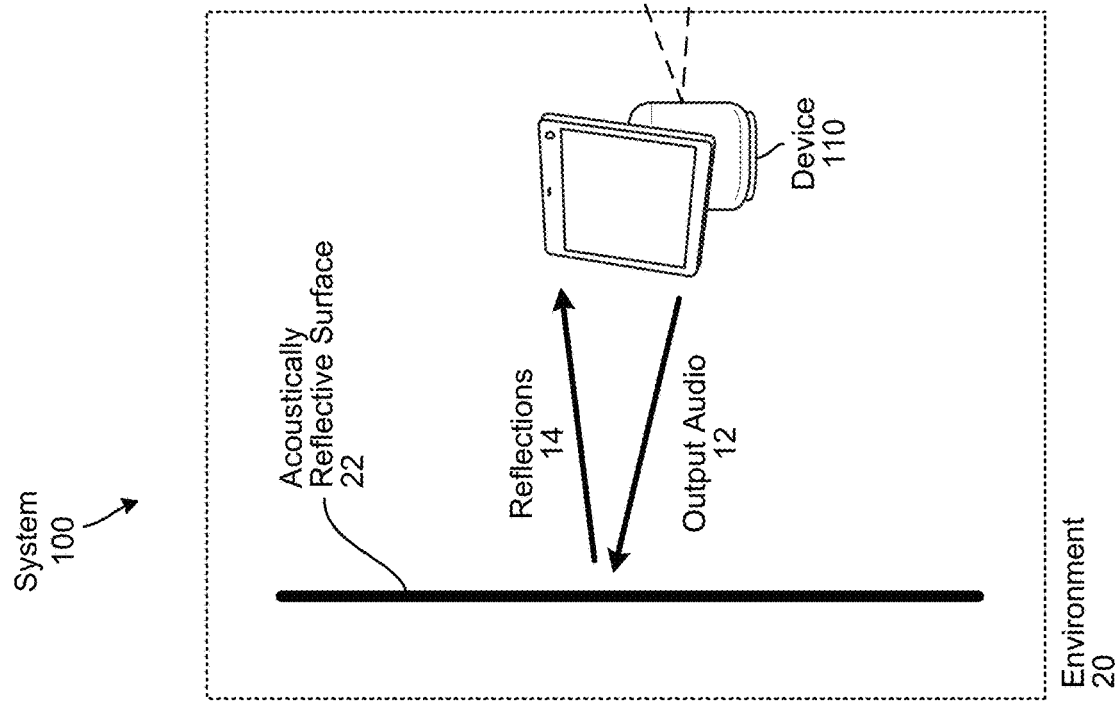

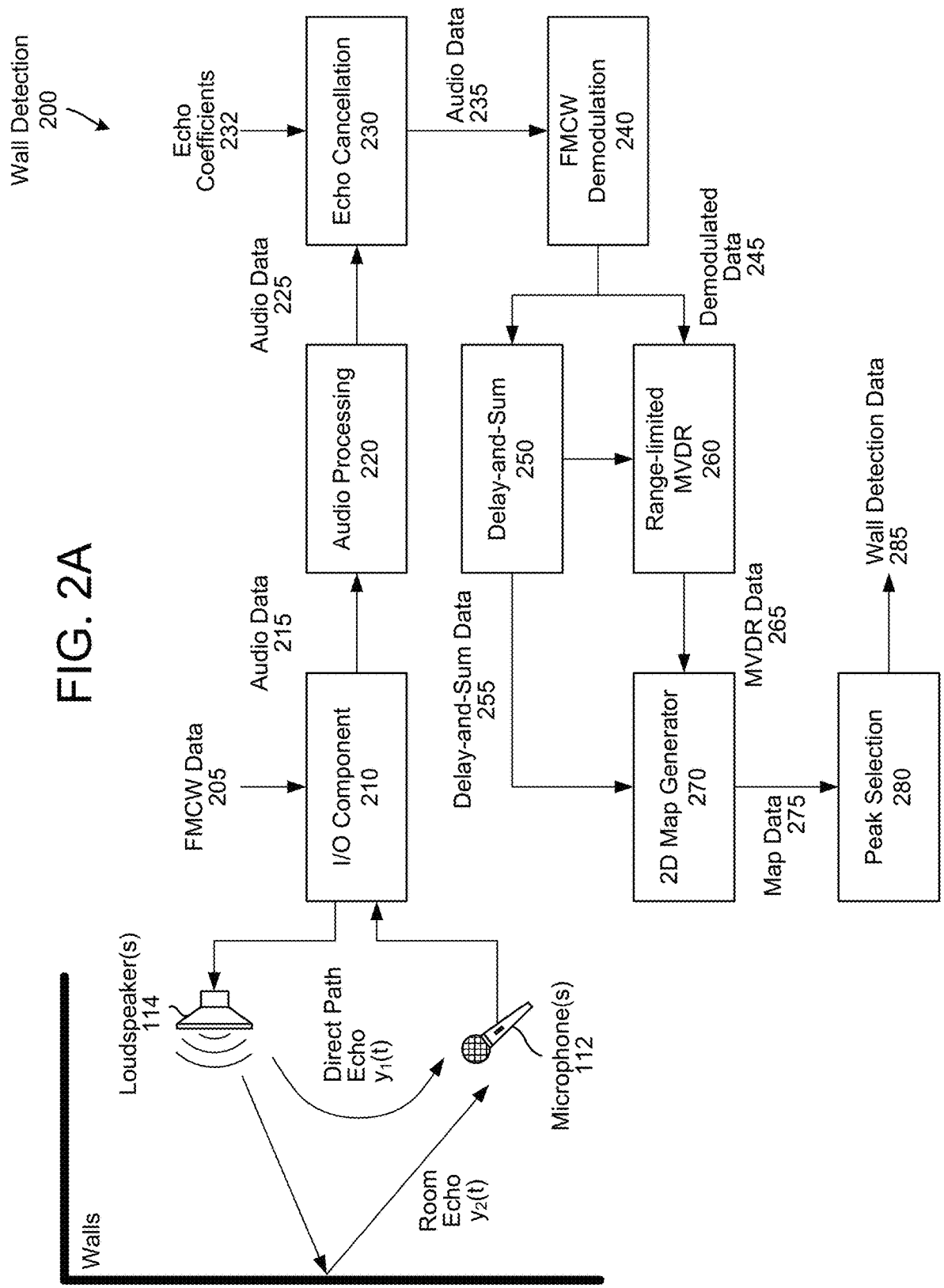

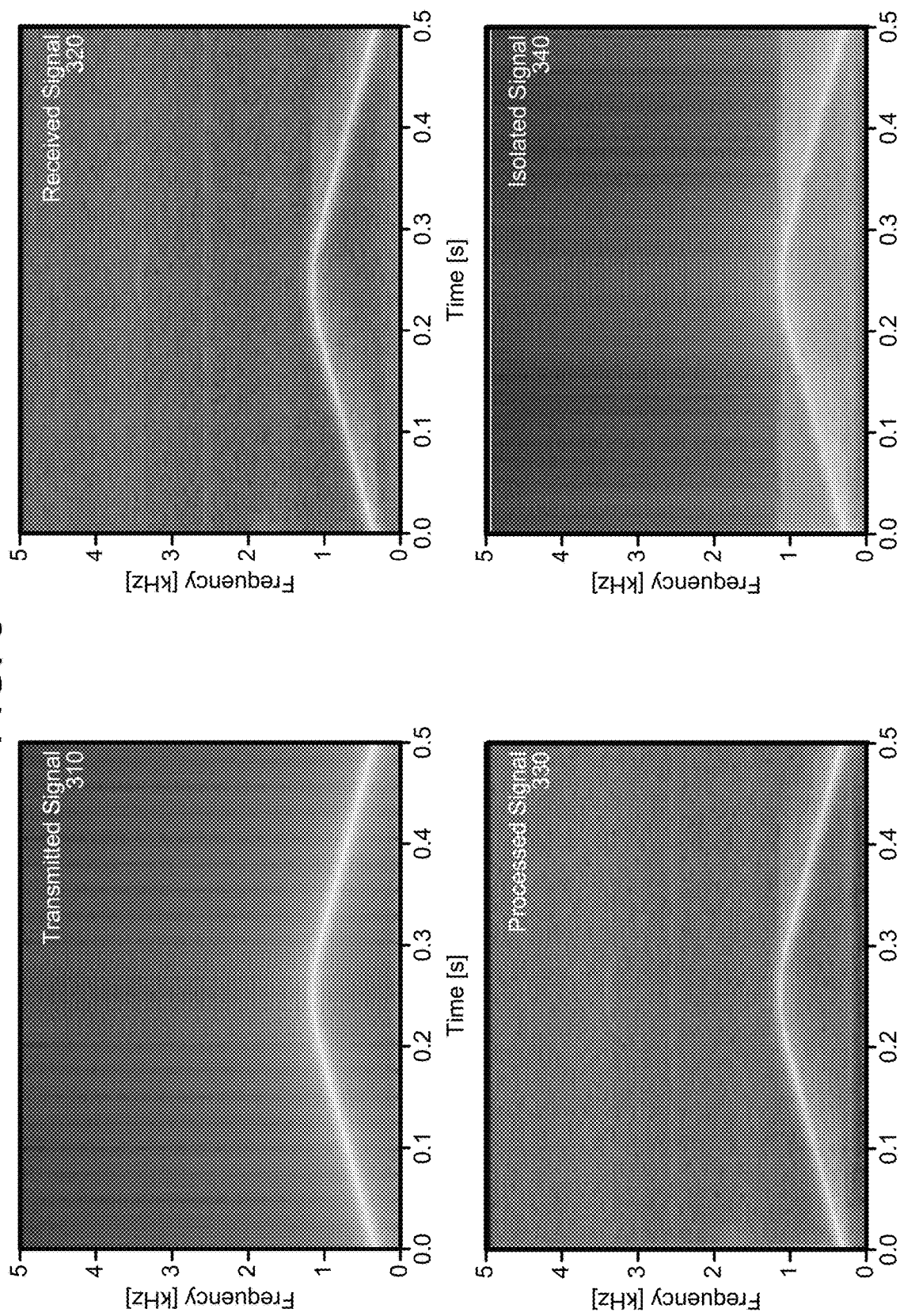

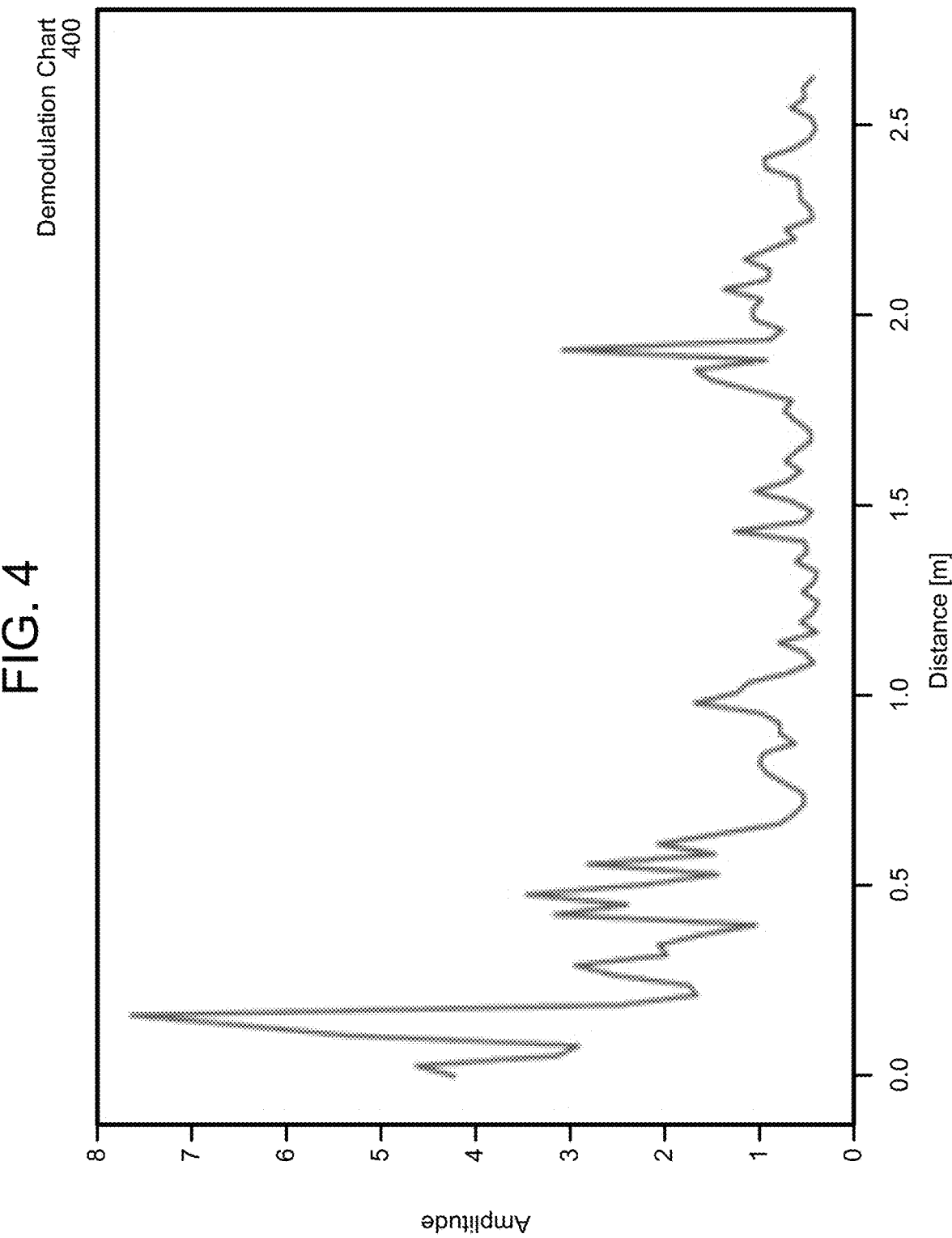

FIG. 9A
Basic Classification 900
Free Classification 920
910a = No
910b = No
910c = No
910d = No
910e = No
910f = No
910g = No
910h = No
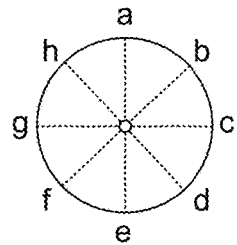
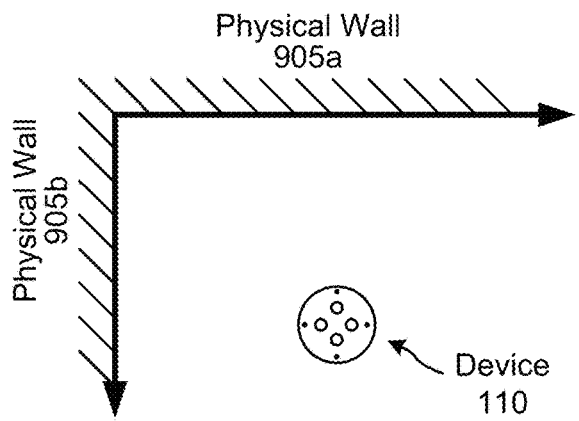
Physical Wall 905a
Physical Wall 905b
Device 110
Wall Classification 925
910a = Yes
910b = No
910c = No
910d = No
910e = No
910f = No
910g = No
910h = No
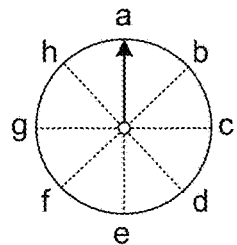
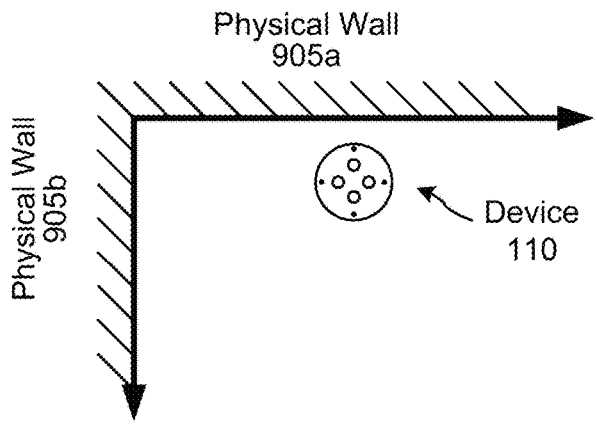
Physical Wall 905a
Physical Wall 905b
Device 110
Corner Classification 930
910a = Yes
910b = No
910c = No
910d = No
910e = No
910f = No
910g = Yes
910h = No
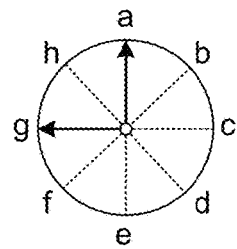
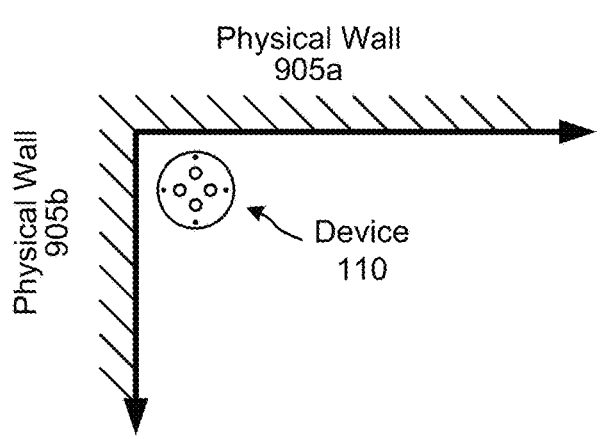
Physical Wall 905a
Physical Wall 905b
Device 110

FIG. 9B
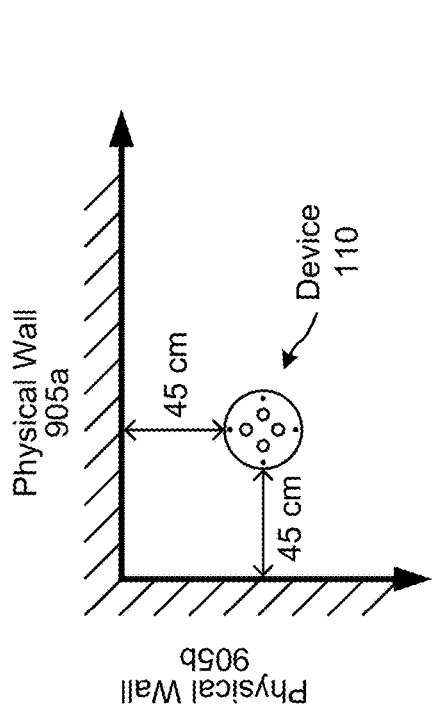
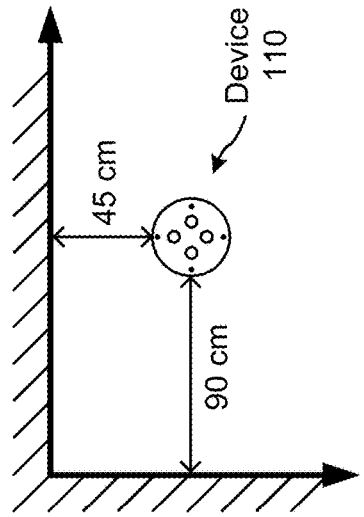
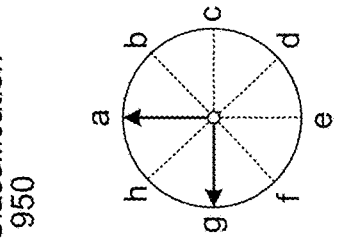

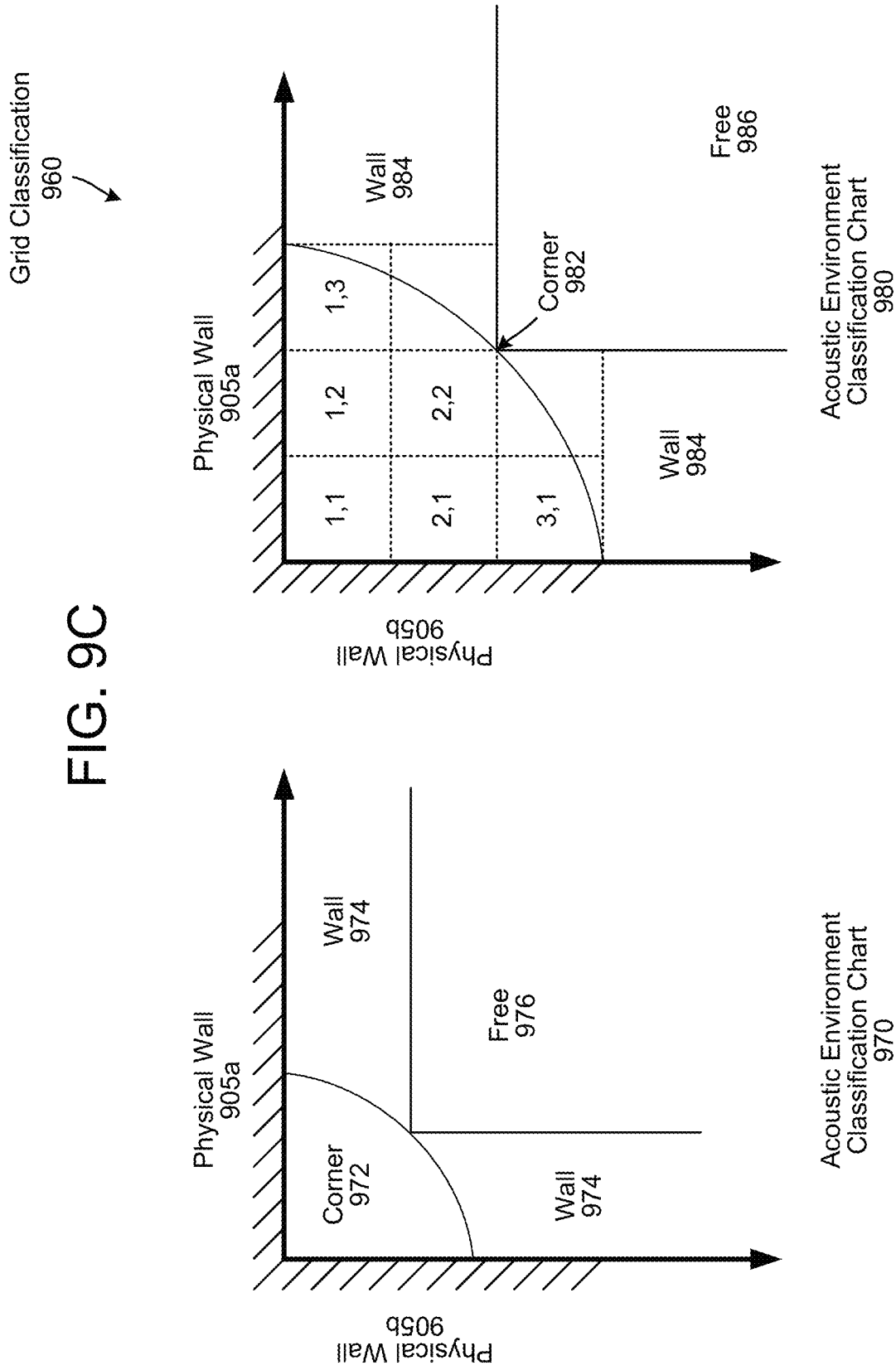

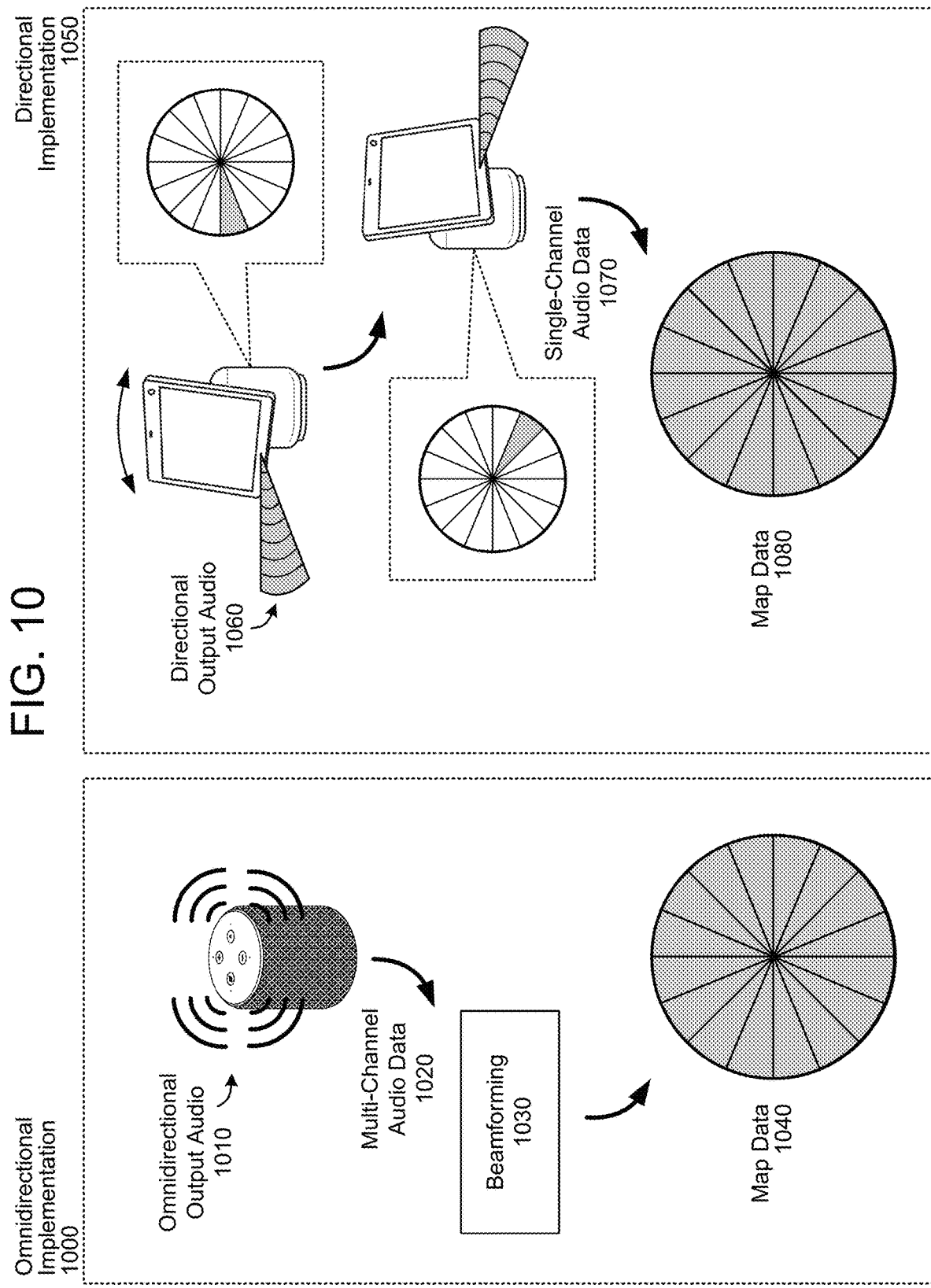

METHOD FOR WALL DETECTION AND LOCALIZATION

BACKGROUND

With the advancement of technology, the use and popularity of electronic devices has increased considerably. Electronic devices are commonly used to capture and process audio data.

BRIEF DESCRIPTION OF DRAWINGS

For a more complete understanding of the present disclosure, reference is now made to the following description taken in conjunction with the accompanying drawings.

FIG. 1 illustrates a system for performing wall detection according to embodiments of the present disclosure.

FIGS. 2A-2B illustrate example component diagrams for performing wall detection according to embodiments of the present disclosure.

FIG. 3 illustrates examples of audio signals processed while performing wall detection according to embodiments of the present disclosure.

FIG. 4 illustrates an example of a time-of-arrival profile according to embodiments of the present disclosure.

FIGS. 9A-9C illustrate examples of determining acoustic environment classifications according to embodiments of the present disclosure.

FIG. 10 illustrates examples of an omnidirectional implementation and a directional implementation according to embodiments of the present disclosure.

DETAILED DESCRIPTION

Figure 2B:
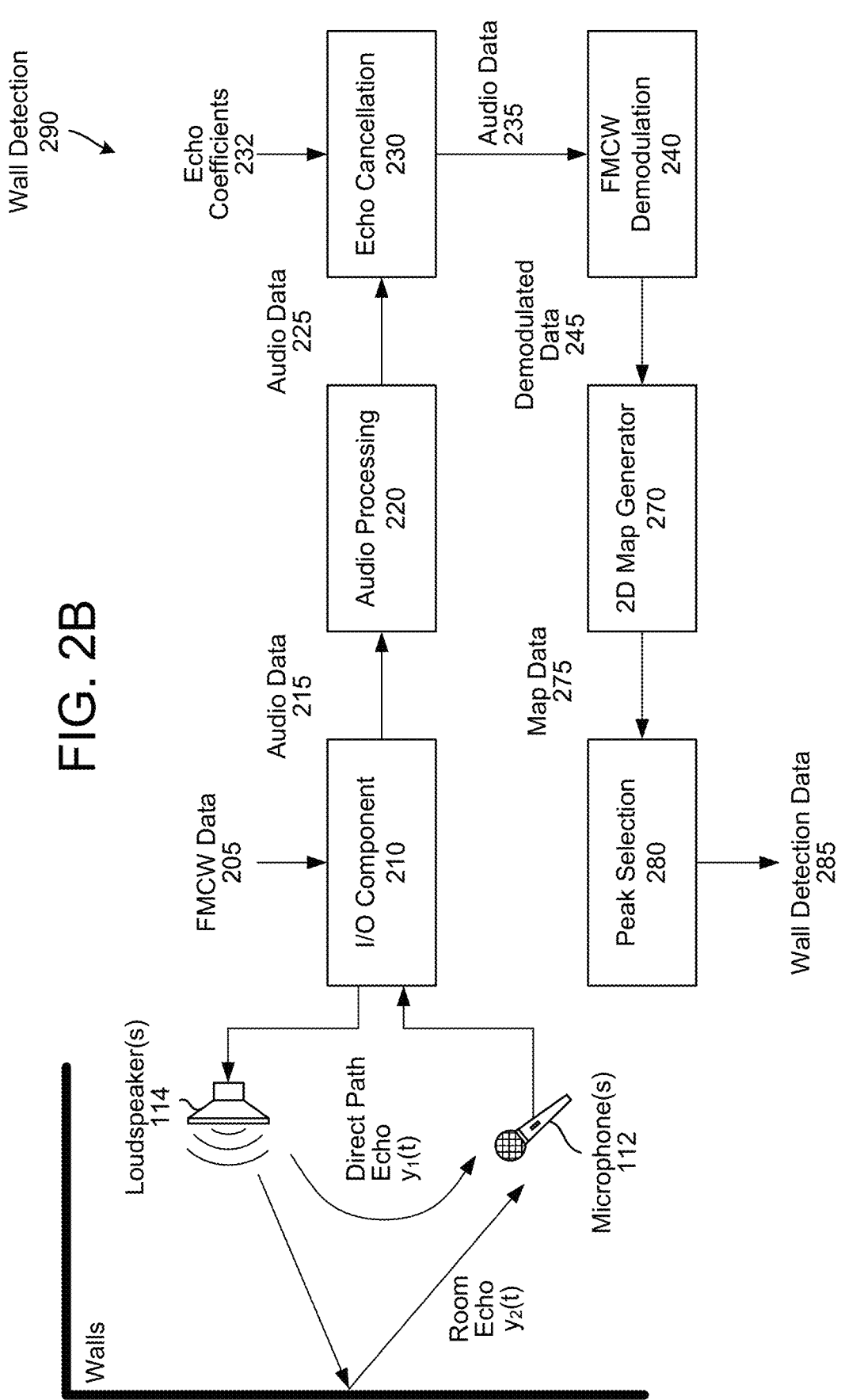

Electronic devices may be used to capture audio data and generate audio. For example, an electronic device may generate audio using loudspeakers and may capture audio data using one or more microphones. If the electronic device is located in the vicinity of hard surfaces (e.g., walls, ceiling, shelves, etc.), the presence of acoustically reflective surfaces negatively impacts performance of the electronic device. For example, the presence of acoustically reflective surfaces can have a negative effect on both speech recognition performance and sound quality, and reflections from the acoustically reflective surfaces can confuse sound source localization. As a result, the device may be unable to accurately locate a user.

To improve a user experience, devices, systems and methods are disclosed that perform acoustic wall detection and localization. For example, the device may determine position(s) of acoustically reflective surface(s) relative to the device and modify audio settings and/or perform sound source localization based on the position(s). To perform acoustic wall detection, the device emits an audible sound including a frequency modulated signal and captures reflections of the audible sound. The frequency modulated signal enables the device to determine an amplitude of the reflections at different time-of-arrivals, which corresponds to a direction of the reflection. The device then performs beamforming to generate a 2D intensity map that represents an intensity of the reflections at each spatial location around the device. The device detects wall(s) in proximity to the device by identifying peak intensities represented in the 2D intensity map. In some examples, instead of performing beamforming, the device can perform directional wall detection by physically rotating the device and emitting the audible sound in multiple directions. Additionally or alternatively, the device can perform ultrasonic wall detection by emitting ultrasonic sounds that are not audible to humans.

FIG. 1 illustrates a system for performing wall detection using a device according to embodiments of the present disclosure. As illustrated in FIG. 1, a system 100 may include a device 110 that has one or more microphone(s) 112 and one or more loudspeaker(s) 114. To detect user speech or other audio, the device 110 may use one or more microphone(s) 112 to generate microphone audio data that captures audio in a room (e.g., an environment) in which the device 110 is located. As is known and as used herein, "capturing" an audio signal includes a microphone transducing audio waves (e.g., sound waves) of captured sound to an electrical signal and a codec digitizing the signal to generate the microphone audio data.

The device 110 may also send playback audio data to the loudspeaker(s) 114 and the loudspeaker(s) 114 may generate audible sound(s) based on the playback audio data. When the loudspeaker(s) 114 generate the audible sound(s), the microphone(s) 112 may capture portions of the audible sound(s) (e.g., an echo), such that the microphone audio data may include a representation of the audible sound(s) generated by the loudspeaker(s) 114 (e.g., corresponding to portions of the playback audio data) in addition to any additional sounds (e.g., local speech from a user) picked up by the microphone(s) 112. Thus, the microphone audio data may be referred to as input audio data and may include a representation of the audible sound(s) output by the loudspeaker(s) 114 and/or a representation of the speech input. In some examples, the microphone(s) 112 may be included in a microphone array, such as an array of eight microphones. However, the disclosure is not limited thereto and the device 110 may include any number of microphone(s) 112 without departing from the disclosure.

The device 110 may perform wall detection to detect one or more walls (e.g., acoustically reflective surface 22) in proximity to the device 110 and/or to determine a distance to the wall(s). For example, the device 110 may generate output audio 12 representing the audible sound(s) using the loudspeaker(s) 114. Incident sound waves associated with the audible sound(s) (e.g., output audio 12) may propagate through the air in a first direction (e.g., toward the acoustically reflective surface 22) until they reach acoustically reflective surface 22 (e.g., first wall), at which point first reflected sound waves (e.g., reflections 14) may be reflected by the first wall and propagate through the air until being detected by the microphone(s) 112 of the device 110. While not illustrated in FIG. 1, the incident sound waves may also propagate through the air in a second direction (e.g., toward a second wall) until they reach the second wall, at which point second reflected sound waves may be reflected by the second wall and propagate through the air until being detected the microphone(s) 112. Thus, the device 110 may detect first reflected sound waves associated with the first wall and may detect second reflected sound waves associated with the second wall.

When the loudspeaker(s) 114 generate the audible sounds at a first time, the microphone(s) 112 may detect strong original sound waves (e.g., incident sound waves) at a second time soon after the first time, which may be referred to as "direct sound." If the device 110 is located in a center of a relatively large room (e.g., relatively large distance between the device 110 and a nearest acoustically reflective surface 22), there may be a lengthy time delay before a third time that the microphone(s) 112 detects reflected sound waves that are reflected by the acoustically reflective surfaces, which may be referred to as "reflections." As a magnitude of a sound wave is proportional to a distance traveled by the sound wave, the reflected sound waves may be relatively weak in comparison to the incident sound waves. In contrast, if the room is relatively small and/or the device 110 is located near an acoustically reflective surface, there may be a relatively short time delay before the microphone(s) 112 detects the reflected sound waves at the third time and the reflected sound waves may be stronger in comparison to the incident sound waves. If a first acoustically reflective surface is in proximity to the device 110 and a second acoustically reflective surface is distant from the device 110, the device 110 may detect "early reflections" reflected by the first acoustically reflective surface prior to detecting "late reflections" reflected by the second acoustically reflective surface.

A time delay of a reflection is proportional to a distance traveled by the reflected sound waves. Thus, early reflections correspond to candidate walls in proximity to the device 110 and late reflections correspond to candidate walls that are distant from the device 110. Based on the time delay associated with an individual reflection, the device 110 may determine a distance from the device 110 to a candidate wall corresponding to the reflection.

While the description of FIG. 1 refers to an example of the device 110 performing wall detection by emitting audible sounds using the loudspeaker(s) 114 and capturing the reflected sound waves using the microphone(s) 112, the disclosure is not limited thereto. For example, the device 110 may perform wall detection using a transducer or other sensor without departing from the disclosure. Thus, while the description refers to a specific example involving the loudspeaker(s) 114 and/or the microphone(s) 112, the techniques described herein may be applied to a transducer and/or other components without departing from the disclosure.

Performing wall detection may be beneficial for a variety of different applications, including improving the sound quality of output audio generated by the device 110, improving echo cancellation for speech recognition, and/or the like. For example, the device 110 may improve sound equalization prior to generating the output audio, taking into account acoustic characteristics of the room to improve the sound quality of the output audio. To illustrate an example, if the device 110 is positioned in a corner of the room the output audio may be perceived as having too much bass, whereas if the device 110 is positioned on an island in the middle of the room the output audio may be perceived as having too little bass. Thus, the device 110 may perform dynamic sound equalization to generate consistent output audio regardless of a position of the device 110 relative to acoustically reflective surfaces. However, the disclosure is not limited thereto and the device 110 may perform wall detection to improve fixed-beamformer selection, environment-adaptive beamforming, beam selection, device arbitration, echo cancellation, and/or the like without departing from the disclosure.

When look directions and beam coefficients of a beamformer are fixed, the device 110 needs to make a decision as to which beam to select for speech recognition. Generally, the goal is to select the beam which points in the direction of a user speaking (e.g., speech direction). A typical approach is to estimate the per-beam signal-to-noise ratio (SNR) and pick the beam with the highest signal-to-noise ratio. While this approach is simple, it does not take into account walls in the vicinity of the device 110, which result in reflections. For example, when the device 110 is placed in the vicinity of an acoustically reflective surface (e.g., wall), the SNR is no longer a good proxy to estimate a speech direction since reflections from the wall have approximately the same power as the direction sound. Depending on the angle of incidence and the beam look directions, the signal power of a beam pointing towards the wall may be larger than that of the beam pointing in the speech direction.

However, knowing distance(s)/elevation(s)/direction(s) of the acoustically reflective surfaces around the device 110, along with a relative location of the acoustically reflective surfaces and/or the device 110, enables the device 110 to disqualify look directions pointing towards the walls and focus beams onto the relevant half-plane (or quarter-plane when the device 110 is positioned in a corner). In some examples, the device 110 may disqualify (e.g., ignore) beams pointing towards a wall, reducing a number of beams from which to select. Additionally or alternatively, the device 110 may redirect the beams to ignore look directions pointing towards the wall, increasing an angular resolution of the beamformer (e.g., each beam is associated with a smaller angle and is therefore more focused).

In conjunction with this information, by tracking which lobe of a beampattern the device 110 most often selects as having the strongest spoken signal path over time, the device 110 may begin to notice patterns in which lobes are selected. If a certain set of lobes (or microphones) is selected, the device can heuristically determine the user's typical speaking location in the environment. The device may devote more CPU resources to digital signal processing (DSP) techniques for that lobe or set of lobes. For example, the device 110 may run acoustic echo cancelation (AEC) at full strength across the three most commonly targeted lobes, instead of picking a single lobe to run AEC at full strength. The techniques may thus improve subsequent automatic speech recognition (ASR) and/or speaker recognition results as long as the device is not rotated or moved.

Criterion and algorithms that generate filter coefficients for specific look directions are generally derived under free-space assumptions, both as they pertain to signal propagation and the noise model (e.g., MVDR and LCMV criterions). Therefore, the device 110 may improve environment-adaptive beamforming as knowledge of the geometry around the device (e.g., acoustically reflective surfaces in proximity to the device 110 and/or a general layout of the room) can be leveraged to move beyond the simplifying free-space assumption and improve beam shapes.

As illustrated in FIG. 1, the device 110 may generate (130) output audio data including a frequency modulated continuous wave (FMCW) signal and may generate (132) output audio 12 using the output audio data. For example, the FMCW signal may correspond to an audible noise (e.g., chirp) and/or an ultrasonic sound represented in the output audio 12. The output audio 12 may propagate through the air towards an acoustically reflective surface 22 and reflections 14 of the output audio may be reflected back towards the device 110.

The device 110 may receive (134) first audio data from one or more microphone(s) and may perform (136) audio processing to generate second audio data. For example, the device 110 may synchronize multiple channels of the first audio data and/or the output audio data to generate the second audio data. Additionally or alternatively, the device 110 may perform echo cancellation and/or direct path suppression to generate the second audio data. For example, the device 110 may generate a reference signal using the FMCW signal and echo coefficients determined for the device 110, although the disclosure is not limited thereto.

The device 110 may perform (138) FMCW demodulation to generate first data. For example, the device 110 may perform FMCW demodulation to a first channel of the second audio data to generate a first portion of the first data, may perform FMCW demodulation to a second channel of the second audio data to generate a second portion of the first data, and so on. As described in greater detail below, the device 110 may perform FMCW demodulation by multiplying the FMCW signal and the second audio data in a time domain and performing a Discrete Fourier Transform (DFT) process to convert to a frequency domain.

The device 110 may generate (140) delay-and-sum data using the first data, may generate (142) range-limited minimum variance distortion-less response (MVDR) data using the first data, and then may generate (144) map data using the delay-and-sum data and/or the range limited MVDR data, as described in greater detail below with regard to FIGS. 2A-2B.

Finally, the device 110 may use the map data to determine (146) wall detection decision data. For example, the device 110 may identify a peak represented in the map data and detect that one or more walls are located in proximity to the device. In some examples, the wall detection decision data indicates whether a wall is in proximity to the device 110. In other examples, the wall detection decision data indicates a relative position of the device 110 to one or more walls. However, the disclosure is not limited thereto, and the wall detection decision data may include any information associated with performing wall detection, such as a number of walls, a relative distance to the walls, and/or the like without departing from the disclosure.

An audio signal is a representation of sound and an electronic representation of an audio signal may be referred to as audio data, which may be analog and/or digital without departing from the disclosure. For ease of illustration, the disclosure may refer to either audio data (e.g., reference audio data or playback audio data, microphone audio data or input audio data, etc.) or audio signals (e.g., playback signals, microphone signals, etc.) without departing from the disclosure. Additionally or alternatively, portions of a signal may be referenced as a portion of the signal or as a separate signal and/or portions of audio data may be referenced as a portion of the audio data or as separate audio data. For example, a first audio signal may correspond to a first period of time (e.g., 30 seconds) and a portion of the first audio signal corresponding to a second period of time (e.g., 1 second) may be referred to as a first portion of the first audio signal or as a second audio signal without departing from the disclosure. Similarly, first audio data may correspond to the first period of time (e.g., 30 seconds) and a portion of the first audio data corresponding to the second period of time (e.g., 1 second) may be referred to as a first portion of the first audio data or second audio data without departing from the disclosure. Audio signals and audio data may be used interchangeably, as well; a first audio signal may correspond to the first period of time (e.g., 30 seconds) and a portion of the first audio signal corresponding to a second period of time (e.g., 1 second) may be referred to as first audio data without departing from the disclosure.

In some examples, the audio data may correspond to audio signals in a time-domain. However, the disclosure is not limited thereto and the device 110 may convert these signals to a subband-domain or a frequency-domain prior to performing additional processing, such as adaptive feedback reduction (AFR) processing, acoustic echo cancellation (AEC), noise reduction (NR) processing, and/or the like. For example, the device 110 may convert the time-domain signal to the subband-domain by applying a bandpass filter or other filtering to select a portion of the time-domain signal within a desired frequency range. Additionally or alternatively, the device 110 may convert the time-domain signal to the frequency-domain using a Fast Fourier Transform (FFT) and/or the like.

As used herein, audio signals or audio data (e.g., microphone audio data, or the like) may correspond to a specific range of frequency bands. For example, the audio data may correspond to a human hearing range (e.g., 20 Hz-20 kHz), although the disclosure is not limited thereto.

For ease of explanation, the following descriptions may refer to the device 110 being located in a "room" and detecting walls associated with the room. However, the disclosure is not limited thereto and the device 110 may be located in an "environment" or "location" (e.g., concert hall, theater, outdoor theater, outdoor area, etc.) without departing from the disclosure.

For ease of explanation, the following descriptions may refer to a "wall" or "candidate wall" in order to provide a clear illustration of one or more techniques for estimating a distance and/or direction associated with an acoustically reflective surface. However, this is intended to provide a simplified example and the disclosure is not limited thereto. Instead, techniques used by the device 110 to estimate a distance and/or direction associated with a candidate wall may be applied to other acoustically reflective surfaces without departing from the present disclosure. Thus, while the following description may refer to techniques for determining a distance and/or direction associated with a candidate wall, one of skill in the art may apply the disclosed techniques to estimate a distance and/or direction associated with any acoustically reflective surface (e.g., ceiling, floor, object, etc.).

If the device 110 includes a single loudspeaker 114, an acoustic echo canceller (AEC) may perform acoustic echo cancellation for one or more microphone(s) 112. However, if the device 110 includes multiple loudspeakers 114, a multi-channel acoustic echo canceller (MC-AEC) may perform acoustic echo cancellation. For ease of explanation, the disclosure may refer to removing estimated echo audio data from microphone audio data to perform acoustic echo cancellation. The system 100 removes the estimated echo audio data by subtracting the estimated echo audio data from the microphone audio data, thus cancelling the estimated echo audio data. This cancellation may be referred to as "removing," "subtracting" or "cancelling" interchangeably without departing from the disclosure.

In some examples, the device 110 may perform echo cancellation using the playback audio data. However, the disclosure is not limited thereto, and the device 110 may perform echo cancellation using the microphone audio data, such as adaptive noise cancellation (ANC), adaptive interference cancellation (AIC), and/or the like, without departing from the disclosure.

In some examples, such as when performing echo cancellation using ANC/AIC processing, the device 110 may include a beamformer that may perform audio beamforming on the microphone audio data to determine target audio data (e.g., audio data on which to perform echo cancellation). The beamformer may include a fixed beamformer (FBF) and/or an adaptive noise canceller (ANC), enabling the beamformer to isolate audio data associated with a particular direction. The FBF may be configured to form a beam in a specific direction so that a target signal is passed and all other signals are attenuated, enabling the beamformer to select a particular direction (e.g., directional portion of the microphone audio data). In contrast, a blocking matrix may be configured to form a null in a specific direction so that the target signal is attenuated and all other signals are passed (e.g., generating non-directional audio data associated with the particular direction). The beamformer may generate fixed beamforms (e.g., outputs of the FBF) or may generate adaptive beamforms (e.g., outputs of the FBF after removing the non-directional audio data output by the blocking matrix) using a Linearly Constrained Minimum Variance (LCMV) beamformer, a Minimum Variance Distortion-less Response (MVDR) beamformer or other beamforming techniques. For example, the beamformer may receive audio input, determine six beamforming directions and output six fixed beamform outputs and six adaptive beamform outputs. In some examples, the beamformer may generate six fixed beamform outputs, six LCMV beamform outputs and six MVDR beamform outputs, although the disclosure is not limited thereto. Using the beamformer and techniques discussed below, the device 110 may determine target signals on which to perform acoustic echo cancellation using the AEC. However, the disclosure is not limited thereto and the device 110 may perform AEC without beamforming the microphone audio data without departing from the present disclosure. Additionally or alternatively, the device 110 may perform beamforming using other techniques known to one of skill in the art and the disclosure is not limited to the techniques described above.

As discussed above, the device 110 may include a microphone array having multiple microphones 112 that are laterally spaced from each other so that they can be used by audio beamforming components to produce directional audio signals. The microphones 112 may, in some instances, be dispersed around a perimeter of the device 110 in order to apply beampatterns to audio signals based on sound captured by the microphone(s). For example, the microphones 112 may be positioned at spaced intervals along a perimeter of the device 110, although the present disclosure is not limited thereto. In some examples, the microphone 112 may be spaced on a substantially vertical surface of the device 110 and/or a top surface of the device 110. Each of the microphones 112 is omnidirectional, and beamforming technology may be used to produce directional audio signals based on audio data generated by the microphones 112. In other embodiments, the microphones 112 may have directional audio reception, which may remove the need for subsequent beamforming.

Using the microphone(s) 112, the device 110 may employ beamforming techniques to isolate desired sounds for purposes of converting those sounds into audio signals for speech processing by the system. Beamforming is the process of applying a set of beamformer coefficients to audio signal data to create beampatterns, or effective directions of gain or attenuation. In some implementations, these volumes may be considered to result from constructive and destructive interference between signals from individual microphones 112 in a microphone array.

The device 110 may include a beamformer that may include one or more audio beamformers or beamforming components that are configured to generate an audio signal that is focused in a particular direction (e.g., direction from which user speech has been detected). More specifically, the beamforming components may be responsive to spatially separated microphone elements of the microphone array to produce directional audio signals that emphasize sounds originating from different directions relative to the device 110, and to select and output one of the audio signals that is most likely to contain user speech.

Audio beamforming, also referred to as audio array processing, uses a microphone array having multiple microphones 112 that are spaced from each other at known distances. Sound originating from a source is received by each of the microphones 112. However, because each microphone is potentially at a different distance from the sound source, a propagating sound wave arrives at each of the microphones 112 at slightly different times. This difference in arrival time results in phase differences between audio signals produced by the microphones. The phase differences can be exploited to enhance sounds originating from chosen directions relative to the microphone array.

Beamforming uses signal processing techniques to combine signals from the different microphones so that sound signals originating from a particular direction are emphasized while sound signals from other directions are deemphasized. More specifically, signals from the different microphones 112 are combined in such a way that signals from a particular direction experience constructive interference, while signals from other directions experience destructive interference. The parameters used in beamforming may be varied to dynamically select different directions, even when using a fixed-configuration microphone array.

A given beampattern may be used to selectively gather signals from a particular spatial location where a signal source is present. The selected beampattern may be configured to provide gain or attenuation for the signal source. For example, the beampattern may be focused on a particular user's head allowing for the recovery of the user's speech while attenuating noise from an operating air conditioner that is across the room and in a different direction than the user relative to a device that captures the audio signals.

Such spatial selectivity by using beamforming allows for the rejection or attenuation of undesired signals outside of the beampattern. The increased selectivity of the beampattern improves signal-to-noise ratio for the audio signal. By improving the signal-to-noise ratio, the accuracy of speaker recognition performed on the audio signal is improved.

The processed data from the beamformer module may then undergo additional filtering or be used directly by other modules. For example, a filter may be applied to processed data which is acquiring speech from a user to remove residual audio noise from a machine running in the environment.

The device 110 may perform beamforming to determine a plurality of portions or sections of audio received from a microphone array (e.g., directional portions, which may be referred to as directional audio data). To illustrate an example, the device 110 may use a first beamforming configuration that includes six portions or sections (e.g., Sections 1-6). For example, the device 110 may divide an area around the device 110 into six sections or the like. However, the present disclosure is not limited thereto and the number of microphone(s) 112 and/or the number of portions/sections in the beamforming may vary. For example, the device 110 may use a second beamforming configuration including eight portions/sections (e.g., Sections 1-8) without departing from the disclosure, although the disclosure is not limited thereto.

The number of portions/sections generated using beamforming does not depend on the number of microphone(s) 112. For example, the device 110 may include twelve microphones 112 in the microphone array but may determine three portions, six portions or twelve portions of the audio data without departing from the disclosure. As discussed above, the beamformer may generate fixed beamforms (e.g., outputs of the FBF) or may generate adaptive beamforms using a Linearly Constrained Minimum Variance (LCMV) beamformer, a Minimum Variance Distortionless Response (MVDR) beamformer or other beamforming techniques. For example, the beamformer may receive the audio input, may determine six beamforming directions and output six fixed beamform outputs and six adaptive beamform outputs corresponding to the six beamforming directions. In some examples, the beamformer may generate six fixed beamform outputs, six LCMV beamform outputs and six MVDR beamform outputs, although the disclosure is not limited thereto.

FIGS. 2A-2B illustrate example component diagrams for performing wall detection according to embodiments of the present disclosure. As illustrated in FIG. 2A, the device 110 may perform wall detection 200 by emitting an audible sound (e.g., chirp) and capturing reflections of the audible sound. For example, the device 110 may include an input/output component 210 that receives frequency modulated continuous wave (FMCW) data 205 and sends the FMCW data 205 (e.g., transmitted signal) to the loudspeaker(s) 114 to generate output audio 12. In some examples, the output audio 12 may be omnidirectional, such that incident sounds waves associated with the output audio 12 propagate through the air in all directions. Some of the incident sound waves (e.g., direct sound) may be detected by the microphone(s) 112 of the device, which is illustrated in FIG. 2A as direct path echo $y_2(t)$. In addition, some of the incident sound waves may reach a wall (e.g., acoustically reflective surface 22) and the wall may generate reflected sound waves (e.g., reflections 14) that propagate through the air until being detected by the microphone(s) 112 of the device 110, which is illustrated in FIG. 2A as room echo $y_2(t)$.

The microphone(s) 112 may generate first audio data 215 (e.g., received signal) that includes a representation of the direct path echo $y_1(t)$ and the room echo $y_2(t)$ and the I/O component 210 may output the first audio data 215 to an audio processing component 220. The audio processing component 220 may be configured to perform audio processing on the first audio data 215 to generate second audio data 225. For example, the audio processing component 220 may be configured to synchronize a first portion of the first audio data 215 (e.g., first channel) corresponding to a first microphone 112a with a second portion of the first audio data 215 (e.g., second channel) corresponding to a second microphone 112b. In addition to synchronizing each of the individual microphone channels included in the first audio data 215, the audio processing component 220 may synchronize the first audio data 215 with the FMCW data 205 (e.g., transmitted signal).

Additionally or alternatively, the audio processing component 220 may perform bandpass filtering to the first audio data 215. For example, the audio processing component 220 may generate the second audio data 225 using only a portion of the first audio data 215 within a desired frequency range, which extends from a lower cutoff frequency to a higher cutoff frequency. Thus, the audio processing component 220 may suppress low frequency components and high frequency components of the first audio data 215 to generate the second audio data 225.

In some examples, the audio processing component 220 may output the second audio data 225 to an echo cancellation component 230 that is configured to perform echo cancellation and generate third audio data 235. For example, the echo cancellation component 230 may use echo coefficients 232 along with the FMCW data 205 to generate a reference signal and then may subtract the reference signal from each microphone channel included in the second audio data 225 to generate the third audio data 235.

The echo coefficients 232 may be fixed values that are specific to the device 110. For example, the device 110 may be placed in an anechoic chamber and may generate output audio representing a white-noise signal across all possible frequencies. By capturing input audio data that represents the output audio, the system 100 may derive an impulse response associated with the device 110. The impulse response only contains the direct path and internal reflections, but the system 100 can use the impulse response to reconstruct a reference signal. For example, the device 110 may apply the impulse response to the FMCW data 205 to generate the reference signal. Thus, the echo coefficients 232 represent the impulse response of the device 110.

In some examples, the echo cancellation component 230 may perform additional processing to suppress the direct path of the output audio 12 represented in the second audio data 225. For example, the device 110 may use the received signal s (e.g., second audio data 225) and the transmitted signal s' (e.g., FMCW data 205) to calculate the impulse response (e.g., I=s/s'). To suppress the direct path, the device 110 may truncate the impulse response within a fixed number of samples (e.g., 60 samples, which corresponds to a time of arrival equivalent to 10 cm, although the disclosure is not limited thereto) to generate a truncated impulse response I'. In some examples, the device 110 may optionally smooth the truncated impulse response using a raised cosine window. The device 110 may then approximate the direct path of the received signal (e.g., $s_{direct}$) by multiplying the received signal by the truncated impulse response (e.g., $s_{direct}$=I's') and then reconstruct the received signal without the direct path (e.g., $s_{reflections}$) by subtracting the direct path of the received signal from the received signal (e.g., $s_{reflections}$=s−$s_{direct}$). However, the disclosure is not limited thereto, and the echo cancellation component 230 may perform direct path suppression using other techniques without departing from the disclosure.

FIG. 3 illustrates examples of audio signals processed while performing wall detection according to embodiments of the present disclosure. As illustrated in FIG. 3, transmitted signal 310 illustrates an example of the FMCW data 205 used to generate the output audio 12, received signal 320 illustrates an example of a single channel of the first audio data 215, processed signal 330 illustrates an example of a single channel of the second audio data 225, and isolated signal 340 illustrates an example of a single channel of the third audio data 235. While not illustrated in FIG. 3, the first audio data 215, the second audio data 225, and the third audio data 235 may include two or more individual microphone channels, depending on the number of microphones 112 used by the device 110.

Referring back to FIG. 2A, after performing echo cancellation and/or direct path suppression, the echo cancellation component 230 may output the third audio data 235 to a FMCW demodulation component 240. The FMCW demodulation component 240 may be configured to perform FMCW demodulation on each channel of the third audio data 235 to generate demodulated data 245. The FMCW signal (e.g., FMCW data 205) has a unique property when it comes to obtaining a time-of-arrival profile, as the FMCW signal can be demodulated to a signal in which frequency components correspond to the amplitude of the reflection at different time-of-arrivals. For example, the FMCW demodulation component 240 may multiply the transmitted signal (e.g., FMCW data 205) with the received signal (e.g., third audio data 235) in a time domain. The resulting signal contains frequency components whose frequency is linearly proportional to the time-of-arrival of each reflection. The FMCW demodulation component 240 may then perform Fourier Transform processing (e.g., apply a Discrete Fourier Transform (DFT), although the disclosure is not limited thereto) to the resulting signal to get the time-of-arrival profile (e.g., $\hat{s}(1)=sig(t)*r(t)^H$), where $\hat{s}(t)$ denotes the time-of-arrival profile, sig(t) denotes the transmitted signal (e.g., FMCW data 205), $r(t)^H$ denotes the receive signal (e.g., third audio data 235), and the time-of-arrival of/corresponds to a frequency component of Bt in the DFT result.

FIG. 4 illustrates an example of a time-of-arrival profile according to embodiments of the present disclosure. For example, FIG. 4 includes a demodulation chart 400 that illustrates an example of a single channel of the time-of-arrival profile (e.g., demodulated data 245) generated by the FMCW demodulation component 240. As illustrated in FIG. 4, the demodulation chart 400 represents an amplitude (e.g., y-axis) of the demodulated signal over distance [m] (e.g., x-axis).

To obtain the direction of the wall, the device 110 may leverage the multiple microphones 112 to estimate an angle-of-arrival profile. However, the device 110 cannot directly apply angle-of-arrival (AoA) techniques because there are reflections other than from neighboring walls. For example, as a ceiling is made of a different material than the walls, the ceiling may reflect more of the output audio back to the device 110 (e.g., the reflections from the ceiling have a larger amplitude than reflections from the walls). Thus, if the device 110 applied AoA techniques directly to the demodulated data 245, the resulting profile would be dominated by reflections from the ceiling.

Instead, the device 110 may leverage the unique properties of the demodulated data 245 to avoid the reflections from the ceiling. For example, as frequency components of the demodulated data 245 corresponds to the amplitude of the reflection at different time-of-arrivals, the device 110 may filter the demodulated data 245 to remove the unwanted reflections from the ceiling.

Referring back to FIG. 2A, the FMCW demodulation component 240 may output the demodulated data 245 to a delay-and-sum beamformer component 250 and to a range-limited minimum variance distortion-less response (MVDR) component 260. As will be described in greater detail below, the device 110 may manipulate the demodulated data 245 using frequency-domain approaches such as band-pass filters.

The device 110 may use a two-step approach to obtain the angle-of-arrival profile for each distance slice, forming a two-dimensional (2D) amplitude image from which the device 110 may extract location(s) of candidate wall(s). For example, the device 110 may generate image data representing a base 2D image, where each point (e.g., pixel) in the image data corresponds to a spatial position in the environment around the device 110. The device 110 then uses a combination of the delay-and-sum beamformer component 250 and the range-limited MVDR component 260 on each point in the image data.

The delay-and-sum beamformer component 250 may receive the demodulated data 245 and may apply delay-and-sum processing to the demodulated data 245 to generate delay-and-sum data 255. Due to the unique properties of the demodulated data 245, if the time-of-arrival (t) of a reflection changes a small amount (dt), the peak frequency in the demodulated data 245 will change accordingly due to their linear relationship. In addition, the phase of that peak frequency will also change by $2\pi fdt$, where $f=f_0-F/T*t$.

The delay-and-sum beamformer component 250 may begin by preparing the demodulated data 245. For example, the delay-and-sum beamformer component 250 may initialize the 2D location map $s_m(x,y)$, which represents the sound propagation time from position (x,y) to microphone (m). The delay-and-sum beamformer component 250 may also calculate the forward path duration $s_f(x,y)$, which represents the sound propagation time from the speaker to the position (x,y). The round-trip propagation delay for each point in the 2D image can be calculation as $S_m(x,y)=s_m(x,y)+s_f(x,y)$ for each microphone (m). Converting the expected round-trip propagation delay into Discrete Fourier Transform (DFT) kernels for the FMCW decoding algorithm obtains the intensity of those time-of-arrivals:

$$K_{memics}(x, y, t) = \exp\left(-1j*2\pi S_m(x, y)\frac{F}{T}t\right) \quad [1]$$

$$p_m(x, y) = \sum_t K_m(x, y, t)*\hat{s}(t) \quad [2]$$

The time-of-arrivals are performed per microphone channel independently. The intensity of each point in p(m,t) can be regarded as the intensity of the reflections in the corresponding location, received by microphone (m).

For each point in the 2D image, the delay-and-sum beamformer component 250 shifts the phase of the value from each microphone to align and combine them:

$$d_{memics}(x, y) = |(x, y) - (x_m, y_m)| + |(x, y) - (x_{speaker}, y_{speaker})| \quad [3]$$

$$p(x, y) = \sum_{memics} p_m(d_m(x, y))*\exp(1j2\pi fd_m(x, y)/v) \quad [4]$$

The result is equivalent to performing delay-and-sum processing on the raw signal (e.g., third audio data 235). However, the resulting delay-and-sum image has two issues, as there are unwanted reflections from other faraway objects, and the result is blurry due to the limit of delay-and-sum that does not produce sharp peaks. To improve the result, we use the delay-and-sum data 255 to improve processing of the range-limited MVDR component 260.

Figure 5:
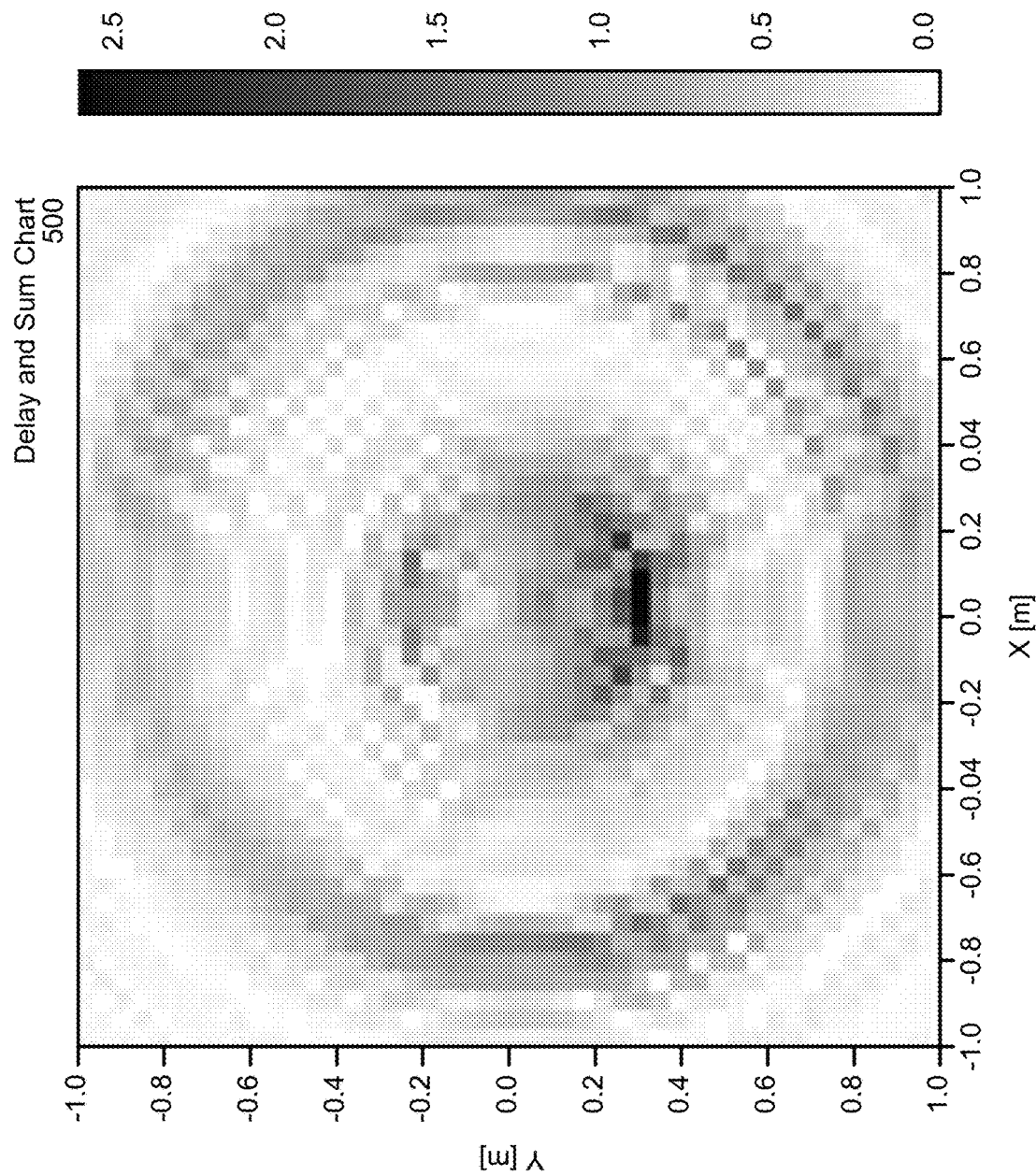
FIG. 5 illustrates an example of data generated by a delay-and-sum beamformer component according to embodiments of the present disclosure.

FIG. 5 illustrates an example of data generated by a delay-and-sum beamformer component according to embodiments of the present disclosure. For example, FIG. 5 includes a delay and sum chart 500 that illustrates an example of the 2D image generated by the delay-and-sum beamformer component 250. As illustrated in FIG. 5, the delay and sum chart 500 represents an intensity of reflections received by the microphone(s) 112 from various locations in an environment of the device 110. For example, the delay and sum chart 500 includes a plurality of pixels, with an individual pixel corresponding to a spatial location relative to the device. Thus, the delay and sum chart 500 is a two-dimensional representation of the environment, with the horizontal axis (e.g., x-axis) indicating a position in a first direction (e.g., between −1 m and 1 m) and the vertical axis (e.g., y-axis) indicating a position in a second direction (e.g., between −1 m and 1 m) that is perpendicular to the first direction. The pixel values of the delay and sum chart 500 represent an intensity of the reflections corresponding to an individual location, and the pixel values vary from a low intensity value (e.g., 0.0) that is represented as a first color (e.g., white) to a high intensity value (e.g., 2.5) that is represented as a second color (e.g., black).

Referring back to FIG. 2A, the range-limited MVDR component 260 may receive the demodulated data 245 and may generate MVDR data 265. For example, the device 110 may process the demodulated data 245 as a band-limited signal and design a sub-band MVDR beamformer process to apply to the demodulated data 245. Across the frequency range associated with the FMCW data 205 (e.g., 3 kHz to 9.2 kHz, although the disclosure is not limited thereto), the device 110 may split the demodulated data 245 into N subbands. For each subband, the device 110 may have L/N samples, where L is the number of samples included in the audible sound (e.g., chirp). For each subband, the range-limited MVDR component 260 may perform MVDR beamforming across all L/N samples for all potential angles.

The range-limited MVDR component 260 may control a few parameters when performing MVDR beamforming. For example, the range-limited MVDR component 260 may determine a cross-correlation matrix to apply, which may be calculated directly from the subband in the frequency domain. In addition, the range-limited MVDR component 260 may determine a steering vector, with the assumption that the device 110 is in a free field, with an omnidirectional loudspeaker, and an equal frequency response across all of the microphone(s) 112. These assumptions may vary depending on the frequency components of the demodulated data 245 (e.g., assumptions may not be valid for ultrasound frequencies).

While the range-limited MVDR component 260 could apply MVDR beamforming on each possible angle to obtain the exact beamformed signal, this is not efficient as the synthesis is computationally expensive. However, the range-limited MVDR component 260 does not need to determine the synthesized beamformed signal, only the gain across all of the angles. The angle-of-arrival profile using MVDR is derived as:

$$g(\theta) = \frac{1}{v^H rxx^{-1} v} \quad [5]$$

where v is the steering vector, rxx=8 is the covariance matrix, and g is the gain-angle function. This is derived as follows:

$$w(\theta) = \frac{v^H rxx^{-1}}{v^H rxx^{-1} v} \quad [6]$$
$$w(\theta) xx^H x = \frac{v^H}{v^H rxx^{-1} v}$$
$$= g(\theta) v^H$$
$$w(\theta) xx^H x = g(\theta) v^H x$$
$$g(\theta) v^H x = w(\theta) x \|x\|$$

where g(θ) is the gain (normalized by ‖x‖) of the MVDR results, compared to the delay-and-sum results (v^H x). Thus, the range-limited MVDR component 260 does not need to compute the weight and apply it to the signal, reducing the computational processing consumption.

After determining the angular profile for all of the subbands, the range-limited MVDR component 260 adds them to obtain the final angular spectrum. To reduce aliasing (e.g., especially for higher frequencies), the range-limited MVDR component 260 may optionally only add low-frequency subbands together, at the cost of a reduction in the signal-to-noise ratio (SNR). In addition, the range-limited MVDR component 260 may apply a Backward Spatial Smoothing technique to reduce the effect of the coherent signals (e.g., reflections that have the same distance but difference angle-of-arrivals) without departing from the disclosure.

To address the issue of unwanted reflections (e.g., from the ceiling), which should be omitted when performing angle-of-arrival estimation, the range-limited MVDR component 260 may extend the MVDR beamforming such that only the reflections within a range of interest are counted. For example, the range-limited MVDR component 260 may use pixel-wise MVDR beamforming similar to the delay-and-sum beamforming described above. However, single pixel information is much noisier and does not produce a clean angular spectrum. Instead, the range-limited MVDR component 260 may select a compromise between the two extremes: the range-limited MVDR component 260 may split the distance dimension to a number of range buckets. For each range, the range-limited MVDR component 260 may manipulate the signal such that only reflections within that range are preserved. Thus, the range-limited MVDR component 260 may perform MVDR beamforming for each individual range, and these results can be merged to obtain the 2D output.

To illustrate an example, as the demodulated FMCW signal (e.g., demodulated data 245) translates the time-of-arrivals into the frequency domain, the device 110 may design bandpass filters to remove reflections that are outside of a desired range. After applying the bandpass filtering, the device 110 may reconstruct the FMCW signal, which only includes reflections within the range of interest, and the range-limited MVDR component 260 may perform MVDR beamforming to the reconstructed FMCW signal to obtain the angle-of-arrival profile.

Figure 6:
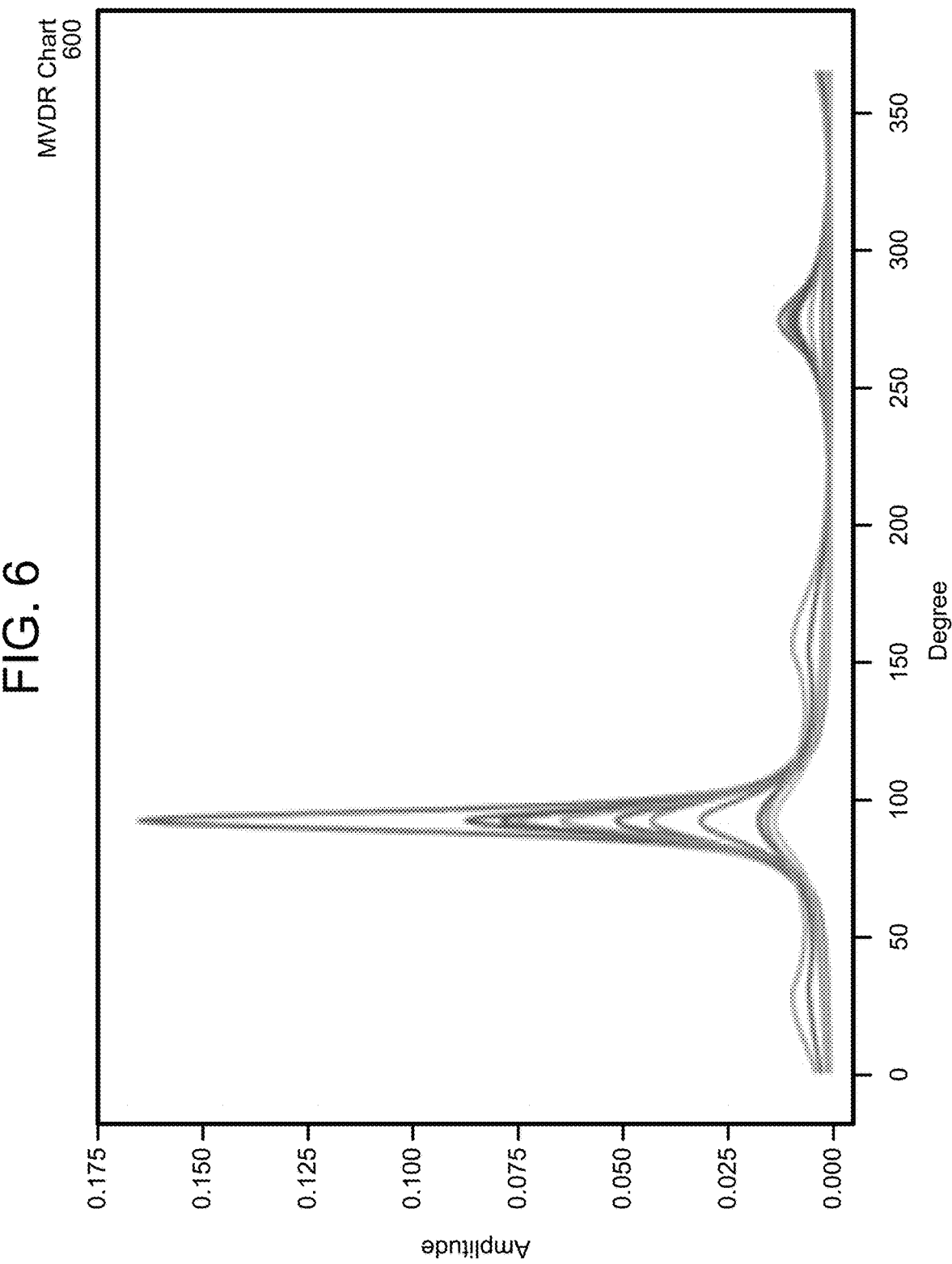
FIG. 6 illustrates an example of data generated by a minimum variance distortion-less response (MVDR) beamformer according to embodiments of the present disclosure.

FIG. 6 illustrates an example of data generated by a minimum variance distortion-less response (MVDR) beamformer according to embodiments of the present disclosure. As illustrated in FIG. 6, MVDR chart 600 illustrates an example of the MVDR data generated by the range-limited MVDR component 260, which represents a gain value (e.g., y-axis) of the MVDR data for each angle [degrees] (e.g., x-axis). Each line depicted in the MVDR chart 600 corresponds to a desired range (e.g., distance), with a first line having a largest gain value corresponding to a first range (e.g., 0.11 m), a second line having a second largest gain value corresponding to a second range (e.g., 0.13 m), and so on until a final line having a smallest gain value corresponding to a final range (e.g., 0.4 m). Thus, the MVDR chart 600 illustrates an example of the angular spectrum of the range-limited MVDR result for a variety of different ranges.

Referring back to FIG. 2A, a 2D map generator component 270 may receive the delay-and-sum data 255 from the delay-and-sum component 250 and/or the MVDR data 265 from the range-limited MVDR component 260 and may generate map data 275. For example, the 2D map output component 270 may combine the delay-and-sum data 255 with the MVDR data 265, although the disclosure is not limited thereto.

Figure 7:
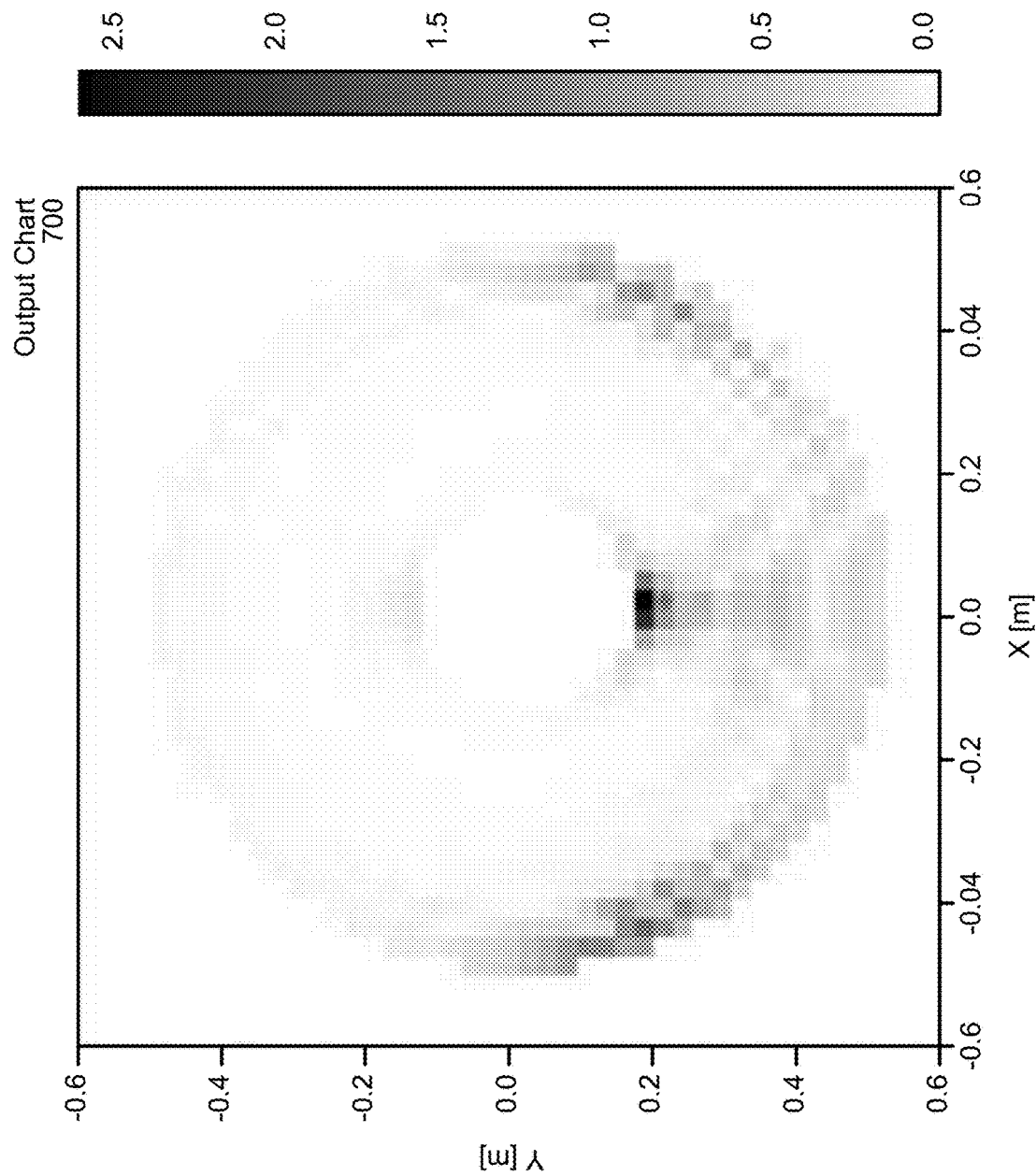
FIG. 7 illustrates an example of two-dimensional output data according to embodiments of the present disclosure.

FIG. 7 illustrates an example of two-dimensional output data according to embodiments of the present disclosure. For example, FIG. 7 includes an output chart 700 that illustrates an example of the 2D image generated by the 2D map generator component 280. As illustrated in FIG. 7, the output chart 700 represents an intensity of reflections received by the microphone(s) 112 from various locations in an environment of the device 110. For example, the output chart 700 includes a plurality of pixels, with an individual pixel corresponding to a spatial location relative to the device. Thus, the output chart 700 is a two-dimensional representation of the environment, with the horizontal axis (e.g., x-axis) indicating a position in a first direction (e.g., between −1 m and 1 m) and the vertical axis (e.g., y-axis) indicating a position in a second direction (e.g., between −1 m and 1 m) that is perpendicular to the first direction. The pixel values of the output chart 700 represent an intensity of the reflections corresponding to an individual location, and the pixel values vary from a low intensity value (e.g., 0.0) that is represented as a first color (e.g., white) to a high intensity value (e.g., 2.5) that is represented as a second color (e.g., black).

Referring back to FIG. 2A, the 2D map generator component 270 may output the map data 275 to a peak selection component 280 and the peak selection component 280 may generate wall detection data 285. For example, the peak selection component 280 may detect a nearest peak location represented in the map data 275 and determine that a wall is associated with the nearest peak location. Using the output chart 700 as an example, the peak selection component 280 may detect a peak in a first direction relative to the device (e.g., bottom middle), which corresponds to the high intensity values located around (x,y) coordinates (0.0, −0.2).

In some examples, the peak selection component 280 may generate wall detection data 285 indicating the direction and/or distance associated with one or more walls. Additionally or alternatively, the peak selection component 280 may generate wall detection data 285 that indicates an acoustic environment classification, as described in greater detail below with regard to FIGS. 9A-9C, based on the number of peaks (e.g., walls).

Figure 8:
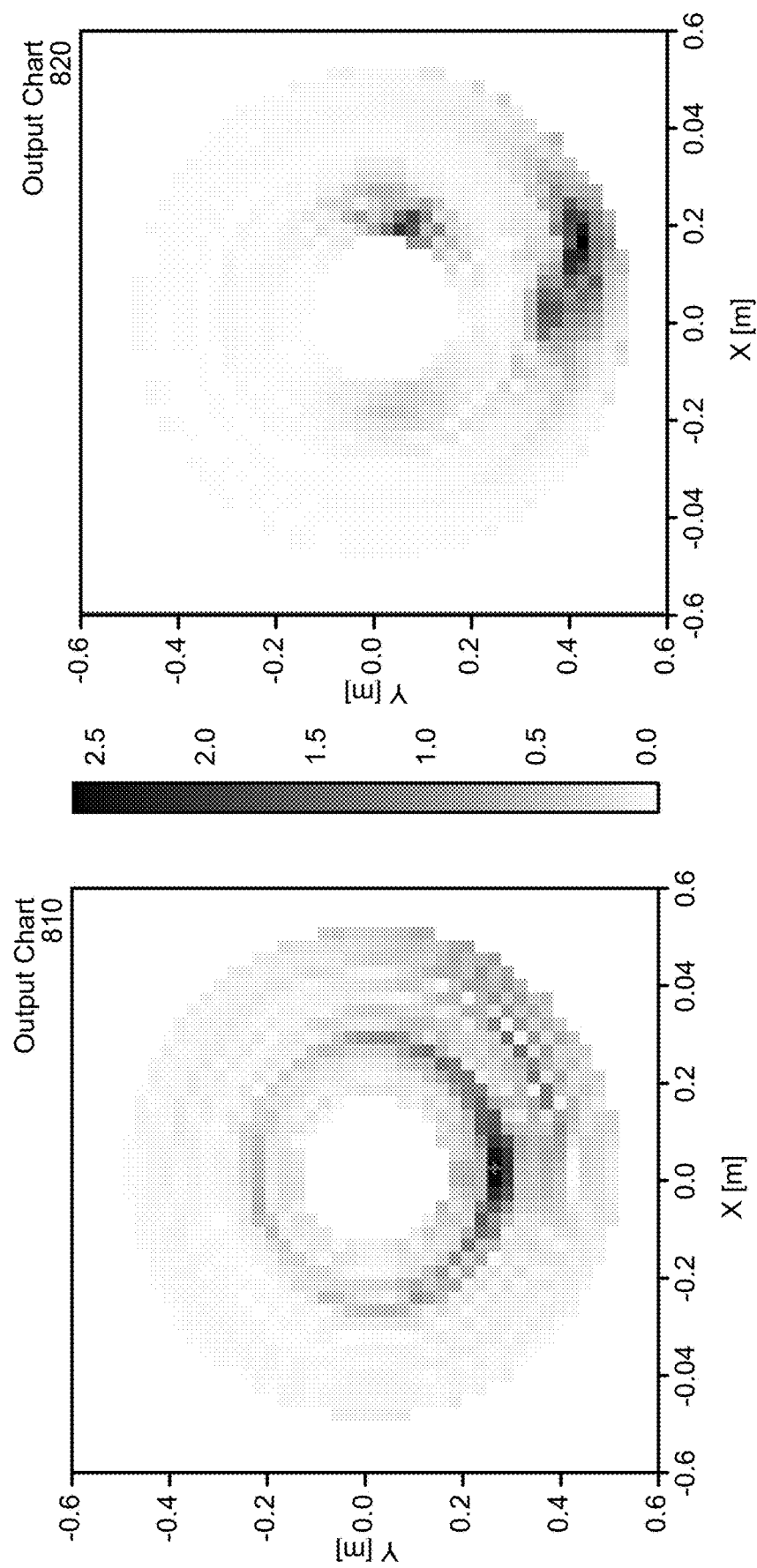
FIG. 8 illustrates additional examples of two-dimensional output data according to embodiments of the present disclosure.

FIG. 8 illustrates additional examples of two-dimensional output data according to embodiments of the present disclosure. For example, FIG. 8 includes a first output chart 810 that illustrates a first example of the 2D image (e.g., map data 275) generated by the 2D map generator component 280 and a second output chart 820 that illustrates a second example of the 2D image. Using the first output chart 810 as a first example, the peak selection component 280 may determine that two peaks that are equidistant from the device. For example, the peak selection component 280 may detect a first peak in a first direction relative to the device (e.g., bottom middle), which corresponds to the high intensity values located around first coordinates (0.0, −0.2), and may also detect a second peak in a second direction relative to the device (e.g., right middle), which corresponds to the high intensity values located around second coordinates (0.2, 0.0). Thus, the first peak corresponds to a first wall that is a first distance (e.g., 20 cm) away in the first direction and the second peak corresponds to a second wall that is the first distance away in the second direction.

In some examples, the device 110 may struggle to distinguish between two walls when the walls are both at the same distance from the device 110. For example, a width of the pulses represented in the map data 275 may be wide enough that the two peaks merge together. To improve wall detection, the device 110 may perform directional wall detection, may increase a resolution of beamforming, may change the probe signal emitted by the loudspeaker(s) 114, and/or the like. In some examples, the device 110 may determine a number of peaks represented in the map data 275 using other techniques and may interpret the output chart 810 based on the number of peaks. For example, the device 110 may determine that there are two peaks represented in the map data 275 and may interpret the output chart 810 as representing two equidistant walls in a first direction and a second direction. Alternatively, the device 110 may determine that there is only one peak represented in the map data 275 and interpret the output chart 810 as representing a single wall in a third direction between the first direction and the second direction without departing from the disclosure.

Using the second output chart 820 as a second example, the peak selection component 280 may determine that two peaks that are present at two difference distances from the device. For example, the peak selection component 280 may detect a first peak in a first direction relative to the device (e.g., bottom middle), which corresponds to the high intensity values located around first coordinates (0.0, −0.4), and may also detect a second peak in a second direction relative to the device (e.g., right middle), which corresponds to the high intensity values located around second coordinates (0.2, 0.0). Thus, the first peak corresponds to a first wall that is a first distance (e.g., 40 cm) away in the first direction and the second peak corresponds to a second wall that is a second distance (e.g., 20 cm) away in the second direction.

In some examples, the device 110 may perform median filtering, mean subtraction, and/or other processing to normalize the data. For example, the 2D map generator component 270 may be configured to perform median filtering and/or mean subtraction as part of generating the map data 275. However, the disclosure is not limited thereto, and in some examples the peak selection component 280 may perform median filtering and/or mean subtraction without departing from the disclosure.

In the example of performing wall detection 200 illustrated in FIG. 2A, the device 110 includes two separate beamformer components; a delay-and-sum component 250 configured to generate the delay-and-sum data 255 and a range-limited MVDR component 260 configured to generate MVDR data 265. In this example, both the delay-and-sum data 255 and the MVDR data 265 may include angular information and distance information, and the 2D map generator component 270 may generate the map data 275 using a combination of the delay-and-sum data 255 and the MVDR data 265. For example, the 2D map generator component 270 may prioritize (e.g., increase a relative weight) first angular information of the delay-and-sum data 255 over second angular information of the MVDR data 265, while prioritizing first distance information of the MVDR data 265 over second distance information of the delay-and-sum data 255, although the disclosure is not limited thereto.

While FIG. 2A illustrates the device 110 including two separate beamformer components, the disclosure is not limited thereto and the number of beamformer components may vary without departing from the disclosure. For example, the device 110 may include a single beamformer component or may include two or more beamformer components without departing from the disclosure. FIG. 2B illustrates an example of the device 110 performing wall detection 290 with beamforming being performed by the 2D map generator component 270. For example, the 2D map generator component 270 may include one or more beamformer component(s) and the 2D map generator component 270 may receive the demodulated data 245 and generate the map data 275 using multiple techniques without departing from the disclosure.

In some examples, the 2D map generator component 270 may include a single beamformer component and may perform beamforming to generate the map data 275 using the single beamformer component. For example, the 2D map generator component 270 may perform delay-and-sum beamforming to generate the map data 275. Alternatively, the 2D map generator component 270 may perform MVDR beamforming to generate the map data 275 without departing from the disclosure. Additionally or alternatively, the 2D map generator component 270 may include two or more beamformers and may perform a combination of beamforming to generate the map data 275 without departing from the disclosure. For example, the 2D map generator component 270 may combine beamforming information between the two or more beamformers using multiple techniques without departing from the disclosure.

FIGS. 9A-9C illustrate examples of determining acoustic environment classifications according to embodiments of the present disclosure. As described above, the device 110 may perform wall detection to determine whether the device 110 is in proximity to any walls. Based on the number of walls in proximity to the device 110, the device 110 may determine an acoustic environment classification. For example, if the device 110 is located at a distance from any wall, the device 110 may associate the acoustic environment with a free classification. If the device 110 is located in proximity to a single wall, the device 110 may associate the acoustic environment with a wall classification. Finally, if the device 110 is located in proximity to two walls, the device 110 may associate the acoustic environment with a corner classification.

In some examples, the device 110 may select between the three main classifications described above. FIG. 9A illustrates three examples associated with a basic classification 900, in which the device 110 selects between these three main classifications. However, the disclosure is not limited thereto, and in other examples the device 110 may determine the acoustic environment classification and determine a distance between the device 110 and each nearby wall. For example, FIG. 9B illustrates two examples of a distance classification 940, in which the device 110 determines distance(s) in addition to the acoustic environment classification. In some examples, instead of using the basic classification 900 and/or determining distance(s) to nearby walls as illustrated by the distance classification 940, the device 110 may distinguish between the acoustic environment classifications and optionally identify a specific location relative to the wall(s). For example, FIG. 9C illustrates two examples of a grid classification 960 that identifies a location of the device 110 relative to the wall(s) with different levels of granularity.

As illustrated in FIG. 9A, a free classification 920 corresponds to the device 110 being positioned in the open away from any acoustically reflective surfaces. Thus, the device 110 may generate reflection data 910 that indicates that an acoustically reflective surface was not detected in any of the directions (e.g., 910a-910h represent "no," indicating that no reflections were detected in the impulse response data generated by the RIR generator components 640). This is illustrated in FIG. 9A as the device 110 having separation from a first physical wall 905a (e.g., wall in front of the device 110) and a second physical wall 905b (e.g., wall to the left of the device 110).

In contrast, a wall classification 925 corresponds to the device 110 being positioned in proximity to (e.g., next to, within a certain distance of, below a distance threshold from, etc.) a single acoustically reflective surface. Thus, the reflection data 910 indicates that a single acoustically reflective surface was detected in a single direction (e.g., 910a represents "yes," indicating that a reflection was detected in the first direction a, while 910b-910h represent "no," indicating that no reflections were detected in the remaining directions b-h). This is illustrated in FIG. 9A as the device 110 being positioned in proximity to the first physical wall 905a (e.g., wall in front of the device 110) but having separation from the second physical wall 905b (e.g., wall to the left of the device 110).

Similarly, FIG. 9A illustrates a corner classification 930 that corresponds to the device 110 being positioned in proximity to (e.g., next to, within a certain distance of, below a distance threshold from, etc.) two acoustically reflective surfaces. Thus, the reflection data 910 indicates that two acoustically reflective surfaces were detected in two separate directions (e.g., 910a and 910g represent "yes," indicating that a reflection was detected in the first direction a [0 degrees] and the seventh direction g [270 degrees], while 910b-910h represent "no," indicating that no reflections were detected in the remaining directions b-f and h). This is illustrated in FIG. 9A as the device 110 being positioned in proximity to the first physical wall 905a (e.g., wall in front of the device 110) and the second physical wall 905b (e.g., wall to the left of the device 110).

While FIG. 9A illustrates three acoustic environment classifications, this is intended for ease of illustration and the disclosure is not limited thereto. Instead, the device 110 may generate and/or select from a plurality of acoustic environment classifications without departing from the disclosure. For example, a "cabinet classification" may correspond to the device 110 being positioned in a cabinet, which the device 110 may detect by determining that the device 110 is positioned in a first corner classification along a horizontal plane and a second corner classification along a vertical plane.

While FIG. 9A illustrates an example of the reflection data 910 including eight different directions (e.g., 910a-910h), the disclosure is not limited thereto and the number of directions may vary without departing from the disclosure. For example, the device 110 may generate reflection data 910 including any number of directions (e.g., 6, 30, 360, etc.) without departing from the disclosure. Additionally or alternatively, while FIG. 9A illustrates the reflection data 910 as including separate values for each of the directions (e.g., yes or no values for each of the eight directions), the disclosure is not limited thereto and the device 110 may generate the reflection data 910 using other techniques without departing from the disclosure. Thus, the reflection data 910 may indicate a relationship between the device 110 and one or more walls using any technique without departing from the disclosure.

In some examples, the device 110 may determine distance(s) associated with the acoustically reflective surface(s). FIG. 9B illustrates two examples of determining distances along with directions associated with acoustically reflective surfaces. For example, FIG. 9B illustrates a corner classification 950 that corresponds to the device 110 being positioned in proximity to (e.g., next to, within a certain distance of, below a distance threshold from, etc.) two acoustically reflective surfaces. Thus, the reflection data 945 indicates that two acoustically reflective surfaces were detected in two separate directions (e.g., 945*a* and 945*g* represent "yes," indicating that a reflection was detected in the first direction a [0 degrees] and the seventh direction g [270 degrees], while 945*b*-945*h* represent "no," indicating that no reflections were detected in the remaining directions b-f and h). This is illustrated in FIG. 9B as the device 110 being positioned in proximity to the first physical wall 905*a* (e.g., wall in front of the device 110) and the second physical wall 905*b* (e.g., wall to the left of the device 110). In addition, the first reflection data 945*a* indicates that the first physical wall 905*a* is located 45 cm from the device 110 in the first direction, while the seventh reflection data 945*g* indicates that the second physical wall 905*b* is located 45 cm from the device 110 in the seventh direction.

Similarly, FIG. 9B illustrates a corner classification 955 that corresponds to the device 110 being at a different relative position in the corner from the corner classification 950. For example, the first reflection data 945*a* indicates that the first physical wall 905*a* is located 45 cm from the device 110 in the first direction, but the seventh reflection data 945*g* indicates that the second physical wall 905*b* is located 90 cm from the device 110 in the seventh direction. Thus, the device 110 is positioned twice as far from the second physical wall 905*b* as the first physical wall 905*a*, as illustrated in FIG. 9B.

While FIG. 9B illustrates only two corner classifications, the disclosure is not limited thereto and the device 110 may determine a plurality of different corner classifications without departing from the disclosure. For example, the device 110 may distinguish between multiple corner classifications based on a ratio between a first distance associated with the first physical wall 905*a* and a second distance associated with the second physical wall 905*b*. To illustrate some examples, the corner classification 950 corresponds to a ratio of 1:1 (e.g., equal distance between the device 110 and the first physical wall 905*a* and the second physical wall 905*b*), whereas the corner classification 955 corresponds to a ratio of 1:2 (e.g., the second physical wall 905*b* is twice as far as the first physical wall 905*a*).

While the example described above calculate the ratio based on a fixed perspective (e.g., first distance relative to the second distance), the disclosure is not limited thereto and the device 110 may determine the ratio based on a shorter distance (e.g., which physical wall is closer to the device 110 at any given time) without departing from the disclosure. For example, a 1:2 ratio may correspond to both (i) when the first physical wall 905*a* is located 45 cm from the device 110 and the second physical wall 905*b* is located 90 cm from the device 110 and (ii) when the second physical wall 905*b* is located 45 cm from the device 110 and the first physical wall 905*a* is located 90 cm from the device 110.

Additionally or alternatively, while the examples described above describe the device 110 determining the corner classification based on estimated distances to the physical walls, the disclosure is not limited thereto. In some examples, the device 110 may determine the acoustic environment classification without estimating distance(s) to the physical walls. Therefore, the device 110 may distinguish between different corner classifications without estimating the distance(s). For example, the device 110 may distinguish between different corner classifications based on a relative power of the reflections, a time delay associated with the reflections, and/or any other techniques known to one of skill in the art without departing from the disclosure.

While FIG. 9B illustrates examples of the device 110 distinguishing between different corner classifications, the disclosure is not limited thereto and the device 110 may use the techniques illustrated in FIG. 9B to distinguish between different wall classifications without departing from the disclosure. For example, the device 110 may determine that a first distance (e.g., 45 cm) corresponds to a first wall classification whereas a second distance (e.g., 90 cm) corresponds to a second wall classification without departing from the disclosure.

FIG. 9C illustrates an example of different acoustic environment classifications according to embodiments of the present disclosure. For example, 9C illustrates an acoustic environment classification chart 970 that illustrates potential positions of the device 110 being classified as one of three acoustic environment classifications. As illustrated in 9C, a corner classification 972 corresponds to the device 110 being in proximity (e.g., below a distance threshold) to both a first physical wall 702 and a second physical wall 704, a wall classification 974 corresponds to the device 110 only being in proximity to a single wall (e.g., either the first physical wall 702 along the top right or the second physical wall 704 along the bottom left), and a free classification 976 corresponds to the device 110 not being in proximity (e.g., above the distance threshold) to either the first physical wall 702 or the second physical wall 704.

In some examples, the device 110 may distinguish between multiple positions in the corner classification 972. For example, 9C illustrates an acoustic environment classification chart 980 that illustrates potential positions of the device 110 being classified as one of three major acoustic environment classifications and subdivides the corner classification into six different sections, for a total of either six or eight acoustic environment classifications (e.g., depending on whether subdivision (2,1) is grouped with or separated from subdivision (1,2), and whether subdivision (3,1) is grouped with or separated from subdivision (1,3)). As illustrated in 9C, a corner classification 982 corresponds to the device 110 being in proximity (e.g., below a distance threshold) to both the first physical wall 702 and the second physical wall 704, a wall classification 984 corresponds to the device 110 only being in proximity to a single wall (e.g., either the first physical wall 702 along the top right or the second physical wall 704 along the bottom left), and a free classification 986 corresponds to the device 110 not being in proximity (e.g., above the distance threshold) to either the first physical wall 702 or the second physical wall 704.

In addition, the corner classification 982 includes six subdivisions, represented as a first subdivision (1,1), a second subdivision (1,2), a third subdivision (1,3), a fourth subdivision (2,1), a fifth subdivision (2,2), and a sixth subdivision (3,1). As mentioned above, the device 110 may treat some subdivisions as equivalent regardless of position by determining a ratio between a smaller distance and a larger distance. For example, the device 110 may group the second subdivision (1,2) and the fourth subdivision (2,1) in a first acoustic environment classification/subclassification (e.g., ratio of 1:2) and group the third subdivision (1,3) and the sixth subdivision (3,1) in a second acoustic environment classification/subclassification (e.g., ratio of 1:3). However, while the first subdivision (1,1) and the fifth subdivision (2,2) have the same ratio between the smaller distance and the larger distance (e.g., ratio of 1:1), the device 110 may distinguish between them based on the overall distance between the device 110 and the nearest wall.

Using the techniques described above, the device 110 may distinguish between six acoustic environment classifications; first corner classification [subdivision (1,1)], second corner classification [subdivision (1,2) and subdivision (2,1)], third corner classification [subdivision (1,3) and subdivision (3,1)], fourth corner classification [subdivision (2,2,)], wall classification 984, and/or free classification 986. However, the disclosure is not limited thereto and the device 110 may combine the first subdivision (1,1) and the fifth subdivision (2,2) for a total of five acoustic environment classifications, may separate the combined subdivisions for a total of eight acoustic environment classifications, and/or the like without departing from the disclosure. Additionally or alternatively, the device 110 may distinguish between multiple wall classifications based on a distance to the nearest physical wall without departing from the disclosure.

While 9C illustrates examples of several acoustic environment classifications (e.g., corner classification 982, wall classification 984, free classification 986), the disclosure is not limited thereto and the device 110 may identify additional classifications not illustrated in 9C. For example, the corner classification 982 illustrated in 9C corresponds to an "inside corner" configuration, in which the device 110 is in close proximity to two acoustically reflective surfaces that cause reflections in 270 degrees around the device 110. In contrast, the device 110 may be located on the other side of both the first physical wall 702 and the second physical wall 704, corresponding to an "outside corner" configuration. While the device 110 would still be in close proximity to the two acoustically reflective surfaces, they would cause reflections for only 90 degrees around the device 110 (e.g., lower right quadrant). The device 110 may distinguish between the two acoustic environment classifications and select parameters accordingly.

FIG. 10 illustrates examples of an omnidirectional implementation and a directional implementation according to embodiments of the present disclosure. As illustrated in FIG. 10, in some examples the device 110 may perform omnidirectional wall detection, while in other examples the device 110 may perform directional wall detection. For example, stationary devices 110 may perform omnidirectional wall detection using beamformer components, as described above with regard to FIGS. 2A-2B. Additionally or alternatively, devices 110 that can move and/or rotate may perform directional wall detection by emitting directional output audio in a plurality of directions, as described in greater detail below with regard to FIG. 11.

FIG. 10 illustrates an example of an omnidirectional implementation 1000 in which the device 110 performs wall detection by generating omnidirectional output audio 1010. For example, the device 110 may generate the omnidirectional output audio 1010 using omnidirectional loudspeakers 114 and may generate multi-channel audio data 1020 representing a portion of the omnidirectional output audio 1010 using two or more microphones 112. Using a beamforming component 1030, the device 110 may process the multi-channel audio data 1020 to generate map data 1040, as described above with regard to FIGS. 2A-2B. The device 110 may use the map data 1040 to determine a direction and/or distance to candidate wall(s) in proximity to the device 110.

In addition, FIG. 10 illustrates an example of a directional implementation 1050 in which the device 110 performs wall detection by generating directional output audio 1060. For example, the device 110 may generate first directional output audio 1060a while in a first orientation corresponding to a first direction (e.g., the loudspeaker(s) 114 generate the first directional output audio 1060a in the first direction relative to the device 110) and may generate first single-channel audio data 1070a capturing any reflections of the first directional output data 1060a. The device 110 and/or loudspeaker(s) 114 may then rotate and generate second directional output audio 1060b while in a second orientation corresponding to a second direction (e.g., the loudspeaker(s) 114 generate the second directional output audio 1060b in the second direction relative to the device 110) and may generate second single-channel audio data 1070b capturing any reflections of the second directional output data 1060b. Thus, the device 110 generates the single-channel audio data 1070 for each of a plurality of directions.

In some examples, a portion of the device 110 rotates relative to the device 110, enabling the loudspeaker(s) 114 to generate the directional output audio 1060 in each of the plurality of directions while the device 110 remains in a fixed location. For example, a screen of the device 110 may include one or more loudspeaker(s) 114 and may be configured to rotate relative to a base of the device 110. Thus, the orientation of the device 110 may correspond to an orientation of the screen relative to the base of the device 110. However, the disclosure is not limited thereto, and in other examples the device 110 itself may rotate without departing from the disclosure. For example, if the device 110 is capable of autonomous motion, the device 110 may rotate and/or move in order to generate the directional output audio 1060 in each of the plurality of directions. Thus, the orientation of the device 110 may correspond to an orientation of the loudspeaker(s) 114 relative to the device 110 and/or a position of the device 110 within the environment without departing from the disclosure.

As the device 110 generates the first single-channel audio data 1070a while outputting the first directional output audio 1060a in the first direction, the first single-channel audio data 1070a is associated with the first direction and captures reflections received from the first direction. Similarly, the second single-channel audio data 1070b is associated with the second direction and captures reflections received from the second direction. Thus, each portion of the single-channel audio data 1070 corresponds to a particular direction of the plurality of directions. As a result, the device 110 may generate the map data 1080 without requiring the beamforming component 1030 associated with the omnidirectional implementation 1000 without departing from the disclosure.

While the directional implementation 1050 illustrates an example in which the device 110 may use a single microphone to generate single-channel audio data 1070 and generate the map data 1080 without the beamforming component 1030, the disclosure is not limited thereto. In some examples, the device 110 may combine the omnidirectional implementation 1000 and the directional implementation 1050 to further improve the wall detection results. For example, the device 110 may generate directional output audio 1060 as illustrated in the directional implementation 1050, but may capture multi-channel audio data 1020 and process the multi-channel audio data 1020 using the beamforming component 1030 without departing from the disclosure.

As illustrated in FIG. 10, the device 110 may perform acoustic wall detection to detect a location, direction, and/or distance associated with a nearby wall. In some examples, the device 110 may perform the acoustic wall detection using audible sounds, such as audio signals within a human hearing range (e.g., 20 Hz-20 kHz), although the disclosure is not limited thereto. In other examples, the device 110 may perform the acoustic wall detection using ultrasonic sounds (e.g., sound waves with a frequency above the upper limit of human hearing, e.g., above 18 kHz, 20 kHz, or the like) without departing from the disclosure. For example, the device 110 may generate the directional output audio 1060 using higher frequency components (e.g., 30-40 kHz), although the disclosure is not limited thereto.

In some examples, the microphone(s) 112 may be configured to detect ultrasonic sounds. For example, a traditional microphone array used to capture human speech may have a first spacing (e.g., microphones 112 are spaced apart 22 mm, although the disclosure is not limited thereto). In contrast, an ultrasonic microphone array used to capture ultrasonic sounds may have a second spacing (e.g., microphones 112 are spaced apart 2.2 mm). However, the disclosure is not limited thereto and the device 110 may capture ultrasonic sounds using a single microphone 112 without departing from the disclosure.

While FIG. 10 illustrates an example of the device 110 performing wall detection by emitting audible sounds using the loudspeaker(s) 114 and capturing the reflected sound waves using the microphone(s) 112, the disclosure is not limited thereto. For example, the device 110 may perform wall detection using a transducer or other sensor without departing from the disclosure. Thus, while the description refers to a specific example involving the loudspeaker(s) 114 and/or the microphone(s) 112, the techniques described herein may be applied to a transducer and/or other components without departing from the disclosure.

Figure 11:
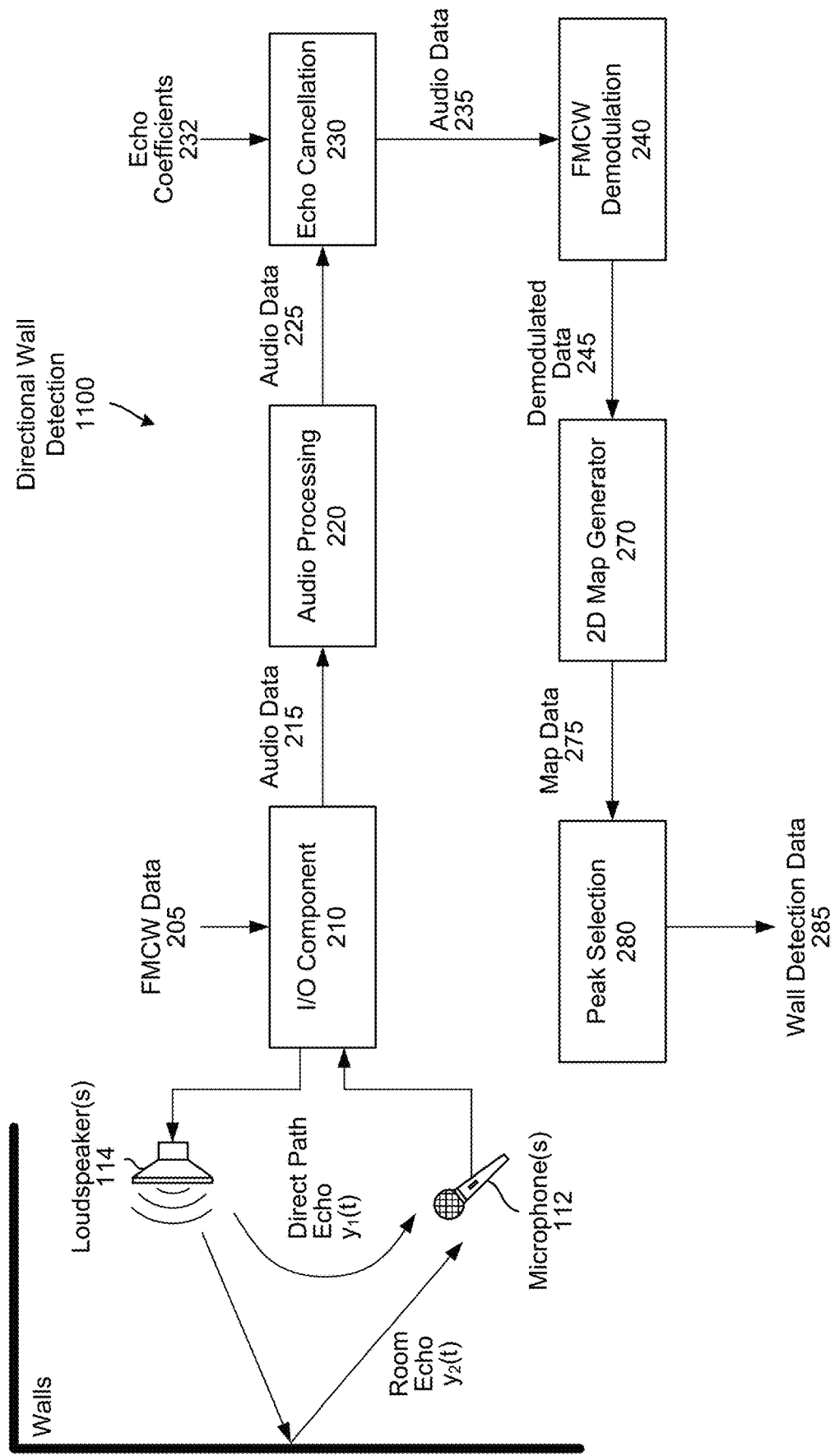
FIG. 11 illustrates an example component diagram for performing directional wall detection according to embodiments of the present disclosure.

FIG. 11 illustrates an example component diagram for performing directional wall detection according to embodiments of the present disclosure. As all of the components illustrated in FIG. 11 were previously described with regard to FIG. 2A, a redundant description is omitted.

As illustrated in FIG. 11, directional wall detection 1100 includes only a portion of the components described above with regard to FIG. 2A. For example, as the device 110 physically rotates and generates demodulated data 245 for a plurality of different angles and/or directions, performing directional wall detection 1100 may omit the beamformer components (e.g., delay-and-sum component 250 and range-limited MVDR component 260) described above. Instead, the device 110 may output the FMCW data 205 individually for the plurality of angles/directions, such that the FMCW demodulation component 240 generates demodulated data 245 that is associated with a particular angle/direction. Thus, the 2D map generator component 270 may generate the map data 275 by combining the demodulated data 245 generated for each of the angles/directions. However, the disclosure is not limited thereto, and in some examples the device 110 may perform beamforming during directional wall detection 1100 without departing from the disclosure.

As illustrated in FIG. 11, the device 110 may include the echo cancellation component 230 and be configured to perform echo cancellation during directional wall detection 1100. However, as the directional wall detection 1100 may optionally generate the output audio using ultrasonic frequency components (e.g., sound waves with a frequency above the upper limit of human hearing), in some examples the device 110 may not perform echo cancellation and the echo cancellation component 230 may be omitted without departing from the disclosure.

Figure 12:
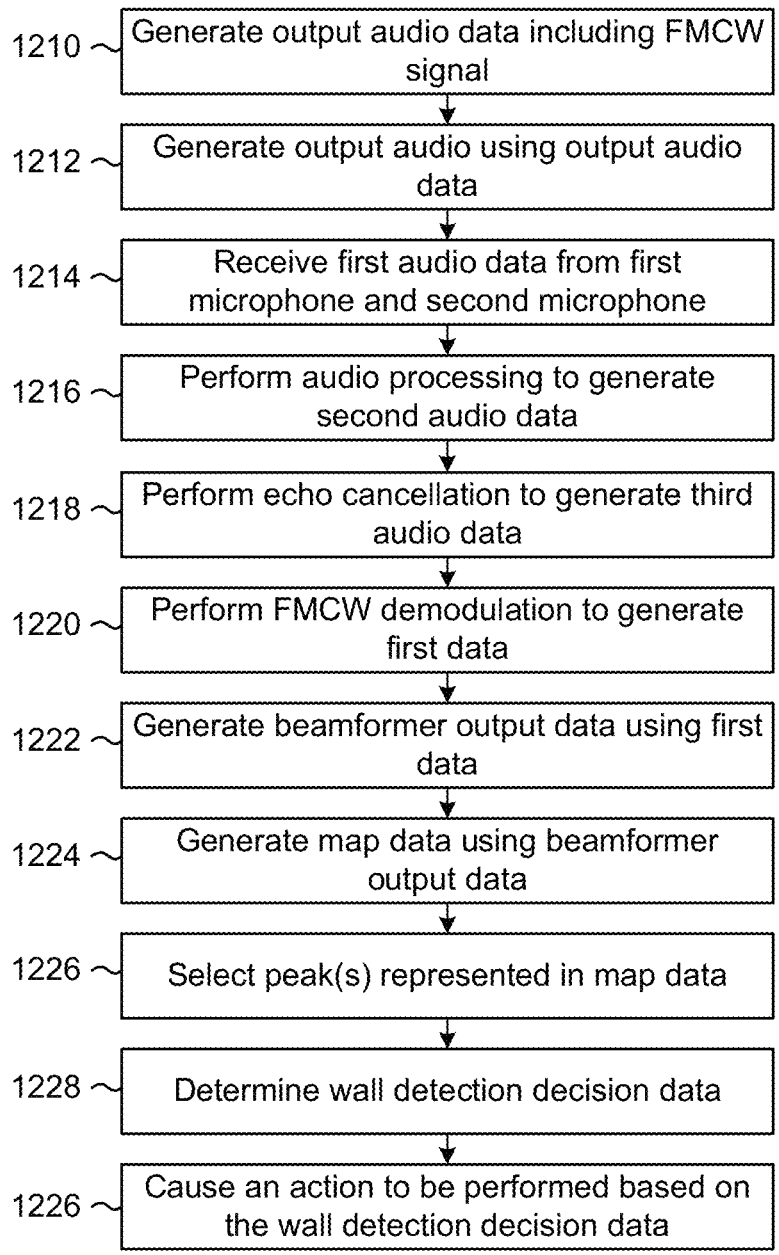
FIG. 12 is a flowchart conceptually illustrating an example method for performing wall detection according to embodiments of the present disclosure.

FIG. 12 is a flowchart conceptually illustrating an example method for performing wall detection according to embodiments of the present disclosure. As illustrated in FIG. 12, the device 110 may generate (1210) output audio data including a FMCW signal and generate (1212) output audio using the output audio data, as described above with regard to FIG. 2A. In addition, the device 110 may receive (1214) first audio data from a first microphone and a second microphone, perform (1216) audio processing to generate second audio data, perform (1218) echo cancellation to generate third audio data, and perform (1220) FMCW demodulation to generate first data as described above with regard to FIG. 2A.

The device 110 may generate (1222) beamformer output data using the first data and may generate (1224) map data using the beamformer output data, as described above with regard to FIGS. 2A-2B. For example, the device 110 may include one or more beamformer components and may generate the map data using the one or more beamformer components. If two or more beamformer components are used, the beamformer output data may include beamformer outputs from each of the beamformer components and the device 110 may apply weight coefficients to the beamformer outputs in order to generate the map data.

The device 110 may select (1226) peak(s) represented in the map data, may determine (1228) wall detection decision data, and may cause (1226) an action to be performed based on the wall detection decision data, as described above with regard to FIG. 2A. For example, the device 110 may determine the wall detection decision data and change audio settings based on a position of the device 110 relative to one or more acoustically reflective surfaces. To illustrate an example, the device 110 may generate output audio using first audio settings if the device 110 is in proximity to a single wall (e.g., wall classification), may generate the output audio using second audio settings if the device 110 is in proximity to two walls (e.g., corner classification), or may generate the output audio using third audio settings if the device 110 is not in proximity to any walls (e.g., free classification). However, the disclosure is not limited thereto and the device 110 may perform additional actions using the wall detection decision data without departing from the disclosure.

Figure 13:
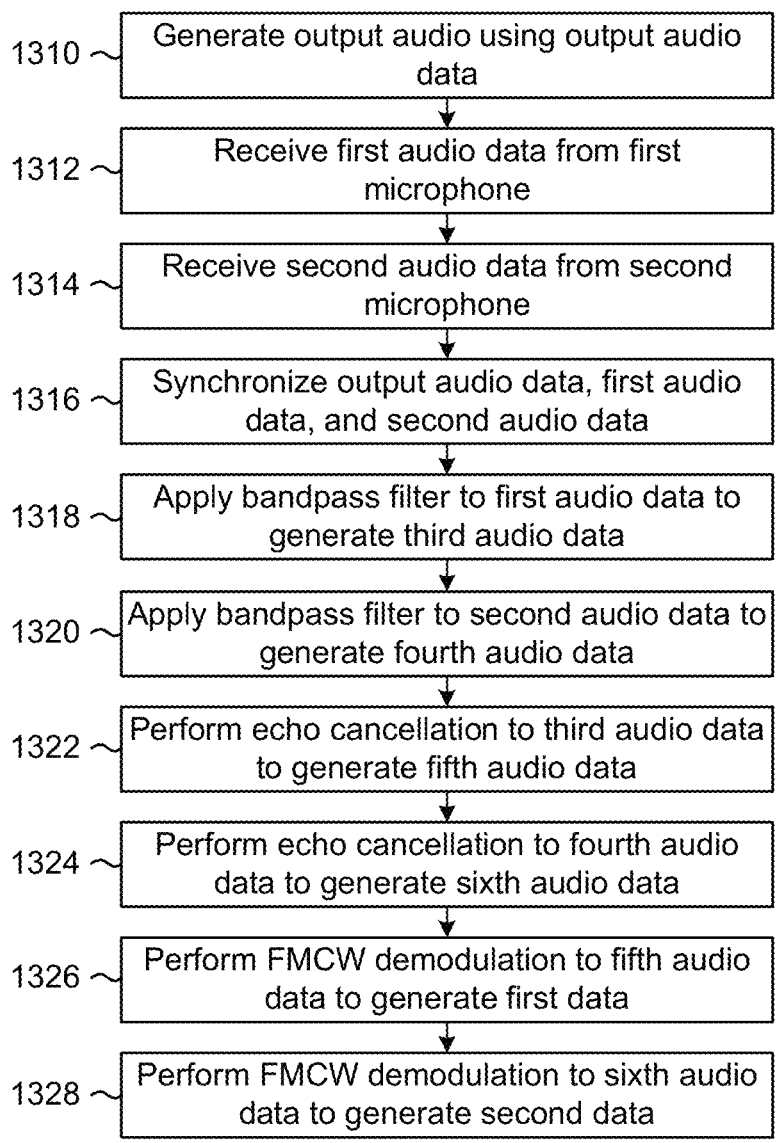
FIG. 13 is a flowchart conceptually illustrating an example method for performing wall detection according to embodiments of the present disclosure.

FIG. 13 is a flowchart conceptually illustrating an example method for performing wall detection according to embodiments of the present disclosure. As illustrated in FIG. 13, the device 110 may generate (1310) output audio using output audio data, may receive (1312) first audio data from a first microphone, and may receive (1314) second audio data from a second microphone. The device 110 may then synchronize (1316) the output audio data, the first audio data, and the second audio data.

The device 110 may apply (1318) a bandpass filter to the first audio data to generate third audio data, may apply (1320) the bandpass filter to the second audio data to generate fourth audio data, may perform (1322) echo cancellation to the third audio data to generate fifth audio data, and may perform (1324) echo cancellation to the fourth audio data to generate sixth audio data, as described in greater detail above with regard to FIG. 2A.

Finally, the device 110 may perform (1326) FMCW demodulation to the fifth audio data to generate first data and may perform (1328) FMCW demodulation to the sixth audio data to generate second data, as described in greater detail above with regard to FIG. 2A.

Figure 14:
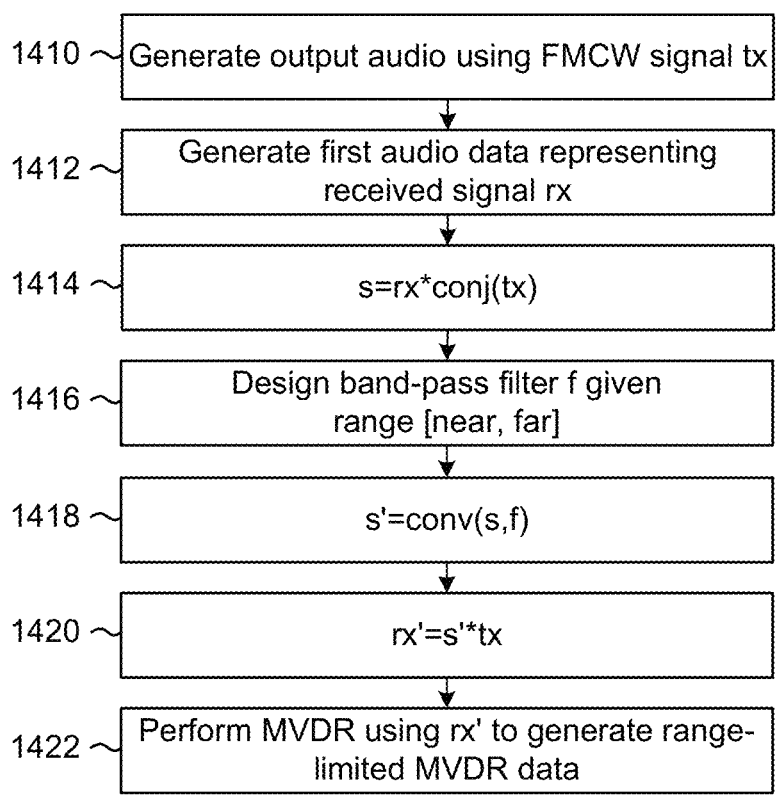
FIG. 14 is a flowchart conceptually illustrating an example method for performing minimum variance distortion-less response (MVDR) processing according to embodiments of the present disclosure.

FIG. 14 is a flowchart conceptually illustrating an example method for performing minimum variance distortion-less response (MVDR) processing according to embodiments of the present disclosure. As illustrated in FIG. 14, the device 110 may generate (1410) output audio using a FMCW signal (tx), may generate (1412) first audio data representing a received signal (rx), and may determine (1412) a demodulated signal (s) using the first audio data and a conjugate of the FMCW signal (tx) (e.g., s=rx*conj(tx)).

The device 110 may design (1416) a band-pass filter (f) given a desired range (e.g., [near, far]) and may determine (1418) a filtered demodulated signal (s') by convolving the demodulated signal (s) and the band-pass filter (f) (e.g., s'=conv(s, f)). As illustrated in FIG. 14, the device 110 may reconstruct the received signal by generating (1420) second audio data representing the reconstructed received signal (rx') using the filtered demodulated signal (s') and the FMCW signal (tx) (e.g., rx'=s'*tx). Finally, the device 110 may perform (1422) MVDR beamforming using the reconstructed received signal (rx') to generate range-limited MVDR data, although the disclosure is not limited thereto. While FIG. 14 illustrates the device 110 designing a single band-pass filter (f), the disclosure is not limited thereto and the device 110 may design multiple band-pass filters and repeat steps 1416-1420 for the multiple band-pass filters without departing from the disclosure.

Figure 15:
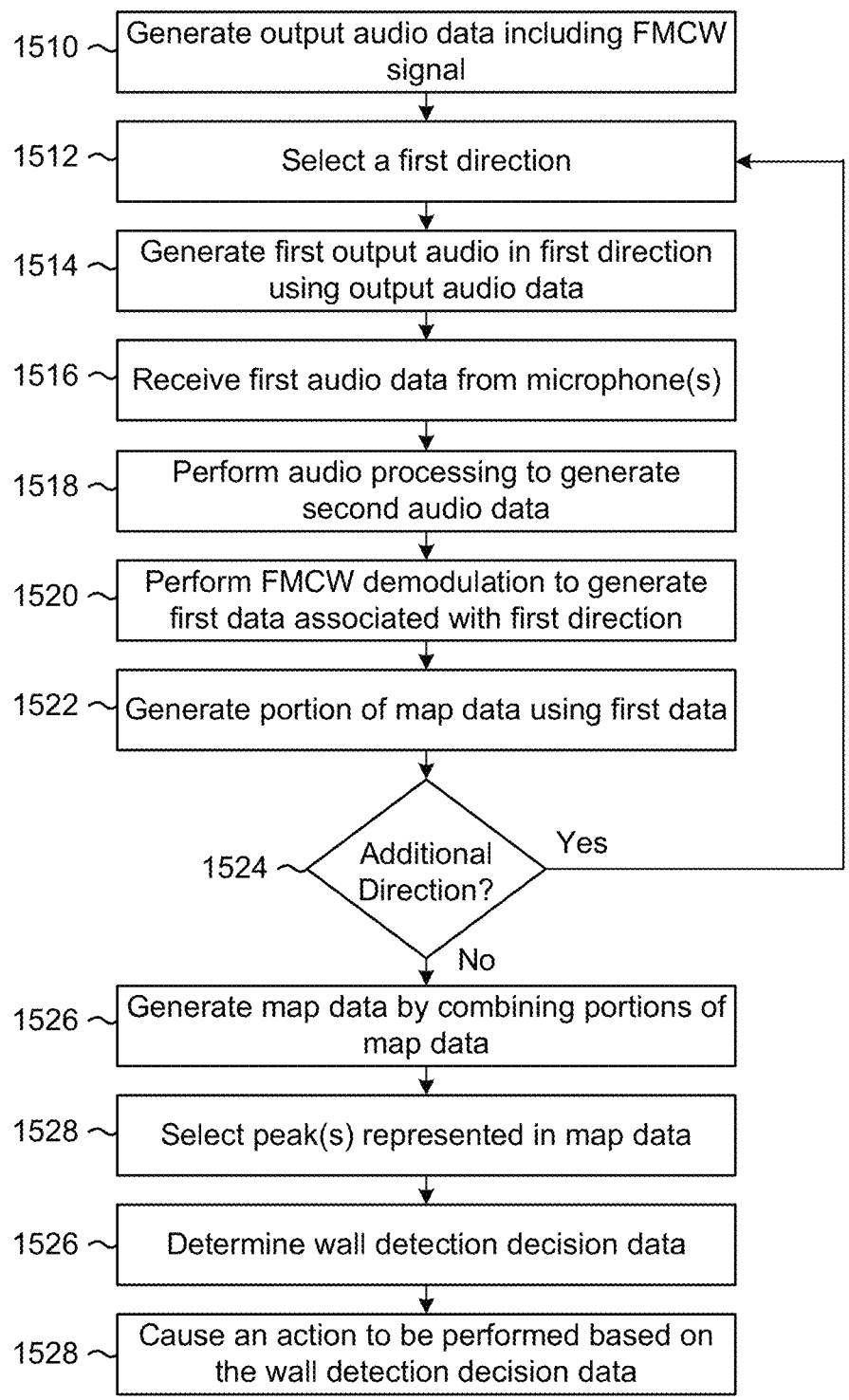
FIG. 15 is a flowchart conceptually illustrating an example method for performing directional wall detection according to embodiments of the present disclosure.

FIG. 15 is a flowchart conceptually illustrating an example method for performing directional wall detection according to embodiments of the present disclosure. As illustrated in FIG. 15, the device 110 may generate (1510) output audio data including a FMCW signal. The device 110 may select (1512) a first direction and may generate (1514) first output audio in the first direction using the output audio data. For example, the device 110 may rotate the loudspeaker(s) 114 to a first orientation associated with the first direction and generate the first output audio while the loudspeaker(s) 114 are in the first orientation.

The device 110 may receive (1516) first audio data from one or more microphone(s) 112, may perform (1518) audio processing to generate second audio data, may perform (1520) FMCW demodulation to generate first data associated with the first direction, and may generate (1522) a first portion of map data using the first data, as described above with regard to FIG. 11. The device 110 may then determine (1524) whether to perform these steps for an additional direction, and if so, may loop to step 1512 and repeat steps 1512-1522 for a second direction.

Once the device 110 has performed steps 1512-1522 for each of a plurality of directions, the device 110 may generate (1526) map data by combining the portions of the map data generated in step 1522 for each of the plurality of directions. The device 110 may then select (1528) peak(s) represented in the map data, determine (1526) wall detection decision data, and cause (1528) an action to be performed based on the wall detection decision data, as described in greater detail above with regard to FIG. 12.

Figure 16:
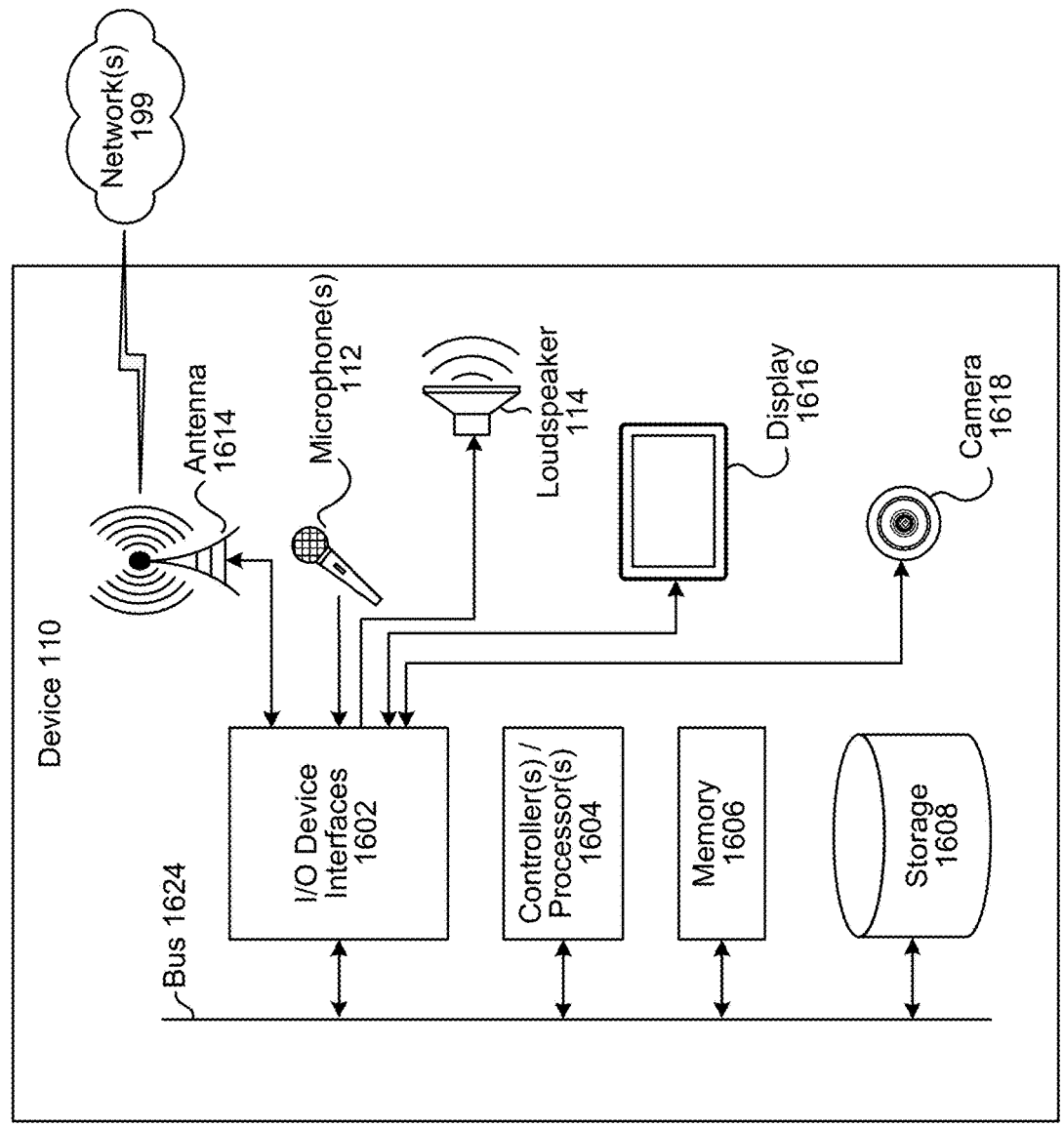
FIG. 16 is a block diagram conceptually illustrating example components of a system for determining a distance and/or direction of an acoustically reflective surface according to embodiments of the present disclosure.

FIG. 16 is a block diagram conceptually illustrating a device 110 that may be used with the system. In operation, the system 100 may include computer-readable and computer-executable instructions that reside on the device 110, as will be discussed further below. As illustrated in FIG. 16, each device 110 may include one or more controllers/processors (1604), which may each include a central processing unit (CPU) for processing data and computer-readable instructions, and a memory (1606) for storing data and instructions of the respective device. The memories (1606) may individually include volatile random access memory (RAM), non-volatile read only memory (ROM), non-volatile magnetoresistive memory (MRAM), and/or other types of memory. Each device 110 may also include a data storage component (1608) for storing data and controller/processor-executable instructions. Each data storage component (1608) may individually include one or more non-volatile storage types such as magnetic storage, optical storage, solid-state storage, etc. Each device 110 may also be connected to removable or external non-volatile memory and/or storage (such as a removable memory card, memory key drive, networked storage, etc.) through respective input/output device interfaces (1602).

Computer instructions for operating each device 110 and its various components may be executed by the respective device's controller(s)/processor(s) (1604), using the memory (1606) as temporary "working" storage at runtime. A device's computer instructions may be stored in a non-transitory manner in non-volatile memory (1606), storage (1608), or an external device(s). Alternatively, some or all of the executable instructions may be embedded in hardware or firmware on the respective device in addition to or instead of software.

Each device 110 includes input/output device interfaces (1602). A variety of components may be connected through the input/output device interfaces (1602), as will be discussed further below. Additionally, each device 110 may include an address/data bus (1624) for conveying data among components of the respective device. Each component within a device 110 may also be directly connected to other components in addition to (or instead of) being connected to other components across the bus (1624).

Referring to FIG. 16, the device 110 may include input/output device interfaces 1602 that connect to a variety of components such as an audio output component such as a loudspeaker(s) 114, a wired headset or a wireless headset (not illustrated), or other component capable of outputting audio. The device 110 may also include an audio capture component. The audio capture component may be, for example, microphone(s) 112 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1616 for displaying content and/or a camera 1618 to capture image data, although the disclosure is not limited thereto.

Via antenna(s) 1614, the input/output device interfaces 1602 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1602) may also include communication components that allow data to be exchanged between devices such as different physical servers in a collection of servers or other components.

The components of the device(s) 110 may include their own dedicated processors, memory, and/or storage. Alternatively, one or more of the components of the device(s) 110 may utilize the I/O interfaces (1602), processor(s) (1604), memory (1606), and/or storage (1608) of the device(s) 110. As noted above, multiple devices may be employed in a single system. In such a multi-device system, each of the devices may include different components for performing different aspects of the system's processing. The multiple devices may include overlapping components. The components of the device(s) 110, as described herein, are illustrative, and may be located as a stand-alone device or may be included, in whole or in part, as a component of a larger device or system.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented in different forms of software, firmware, and/or hardware, such as an acoustic front end (AFE), which comprises, among other things, analog and/or digital filters (e.g., filters configured as firmware to a digital signal processor (DSP)). Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:
    sending, by a device, first audio data to a loudspeaker, the first audio data including a frequency modulated signal;
    outputting, by the loudspeaker, audible sound corresponding to the first audio data;
    generating first data using the frequency modulated signal and second audio data, the first data representing a first time-of-arrival profile and the second audio data including a first representation of the audible sound;
    generating second data using the frequency modulated signal and third audio data, the second data representing a second time-of-arrival profile and the third audio data including a second representation of the audible sound;
    generating third data using the first data, the frequency modulated signal, and a first filter;
    generating fourth data using the second data, the frequency modulated signal, and the first filter;
    processing the third data and the fourth data using one or more Beamformer components to generate fifth data;
    generating sixth data using the fifth data, the sixth data representing an environment of the device and indicating an intensity of the audible sound at a first location in the environment; and
    determining, based on the sixth data, seventh data indicating a position of the device relative to one or more acoustically reflective surfaces in the environment.

2. The computer-implemented method of claim 1, wherein determining the seventh data further comprises:
    detecting, in the sixth data, a first peak indicating that a first acoustically reflective surface, of the one or more acoustically reflective surfaces, is in a first direction relative to the device;
    determining, using the sixth data, a first distance corresponding to the first acoustically reflective surface;
    determining that the sixth data only represents the first peak; and
    determining, using at least the first distance and the first direction, the seventh data indicating the position of the device relative to the first acoustically reflective surface.

3. The computer-implemented method of claim 1, wherein determining the seventh data further comprises:

detecting, in the sixth data, a first peak indicating that a first acoustically reflective surface, of the one or more acoustically reflective surfaces, is in a first direction relative to the device;

detecting, in the sixth data, a second peak indicating that a second acoustically reflective surface, of the one or more acoustically reflective surfaces, is in a second direction relative to the device; and determining, using at least the first direction and the second direction, the seventh data indicating the position of the device relative to the first acoustically reflective surface and the second acoustically reflective surface.

4. The computer-implemented method of claim 1, wherein the frequency modulated signal represents a frequency modulated continuous wave and frequency components of the first data correspond to an amplitude of reflections of the audible sound at different time-of-arrivals.

5. The computer-implemented method of claim 1, wherein generating the first data further comprises:
    generating eighth data by multiplying the first audio data and the second audio data, the eighth data being in a time domain; and
    applying a discrete Fourier transform to the eighth data to generate the first data in a frequency domain.

6. The computer-implemented method of claim 1, wherein processing the third data and the fourth data using the one or more beamformer components further comprises:
    performing delay-and-sum processing on the third data and the fourth data.

7. The computer-implemented method of claim 1, wherein generating the third data further comprises:
    applying the first filter to the first data to generate eighth data, the first filter corresponding to a bandpass filter associated with a first frequency range; and
    generating the third data using the eighth data and the frequency modulated signal,
    wherein processing the third data and the fourth data using the one or more beamformer components further comprises performing minimum variance distortionless response (MVDR) processing on the third data and the fourth data.

8. The computer-implemented method of claim 1, wherein generating the first data further comprises:
    determining first impulse response data using the first audio data and the second audio data;
    generating second impulse response data that includes a portion of the first impulse response data;
    generating fourth audio data using the first audio data, the second audio data, and the second impulse response data; and
    generating the first data using the frequency modulated signal and the fourth audio data.

9. The computer-implemented method of claim 1, further comprising:
    outputting, by the loudspeaker while the loudspeaker is in a first orientation corresponding to a first direction, first output audio corresponding to a first portion of the first audio data;
    receiving, while the loudspeaker is in the first orientation, a first portion of the second audio data and a first portion of the third audio data;
    causing the loudspeaker to be in a second orientation corresponding to a second direction;
    outputting, by the loudspeaker while the loudspeaker is in the second orientation, second output audio corresponding to a second portion of the first audio data; and
    receiving, while the loudspeaker is in the second orientation, a second portion of the second audio data and a second portion of the third audio data.

10. The computer-implemented method of claim 1, further comprising:
    determining, based on the seventh data, first parameters associated with an audio processing component of the device;
    receiving fourth audio data;
    generating, by the audio processing component using the first parameters and the fourth audio data, fifth audio data; and
    sending the fifth audio data to the loudspeaker.

11. A system comprising:
    at least one processor; and
    memory including instructions operable to be executed by the at least one processor to cause the system to:
        output, by a loudspeaker of a device while the loudspeaker is in a first orientation corresponding to a first direction, a first audible sound corresponding to first audio data, the first audio data including a first frequency modulated signal;
        generate first data using the first frequency modulated signal and second audio data, the first data associated with the first direction and representing a first time-of-arrival profile, the second audio data including a representation of the first audible sound, wherein generating the first data further causes the system to:
            determine first impulse response data using the first audio data and the second audio data,
            generate third audio data using the second audio data and a portion of the first impulse response data, and
            generate the first data using the third audio data and the first frequency modulated signal;
        output, by the loudspeaker while the loudspeaker is in a second orientation corresponding to a second direction, a second audible sound corresponding to fourth audio data, the fourth audio data including a second frequency modulated signal;
        generate second data using the second frequency modulated signal and fifth audio data, the second data associated with the second direction and representing a second time-of-arrival profile, the fifth audio data including a representation of the second audible sound;
        generate third data using the first data and the second data, the third data representing an environment of the device and indicating an intensity of the first audible sound at a first location in the environment; and
        determine, based on the third data, fourth data indicating a position of the device relative to one or more acoustically reflective surfaces in the environment.

12. The system of claim 11, wherein the memory further comprises instructions that, when executed by the at least one processor, further cause the system to:
    detect, in the third data, a first peak indicating that a first acoustically reflective surface, of the one or more acoustically reflective surfaces, is in the first direction relative to the device;
    determine, using the third data, a first distance corresponding to the first acoustically reflective surface;
    determine that the third data only represents the first peak; and determine, using at least the first distance and the first direction, the fourth data indicating the position of the device relative to the first acoustically reflective surface.

13. The system of claim 11, wherein the memory further comprises instructions that, when executed by the at least one processor, further cause the system to:
 detect, in the third data, a first peak indicating that a first acoustically reflective surface, of the one or more acoustically reflective surfaces, is in the first direction relative to the device;
 detect, in the third data, a second peak indicating that a second acoustically reflective surface, of the one or more acoustically reflective surfaces, is in the second direction relative to the device; and
 determine, using at least the first direction and the second direction, the fourth data indicating the position of the device relative to the first acoustically reflective surface and the second acoustically reflective surface.

14. The system of claim 11, wherein the first frequency modulated signal represents a frequency modulated continuous wave and frequency components of the first data correspond to an amplitude of reflections of the first audible sound at different time-of-arrivals.

15. The system of claim 11, wherein the memory further comprises instructions that, when executed by the at least one processor, further cause the system to:
 generate fifth data by multiplying the first audio data and the second audio data, the fifth data being in a time domain; and
 apply a discrete Fourier transform to the fifth data to generate the first data in a frequency domain.

16. The system of claim 11, wherein the memory further comprises instructions that, when executed by the at least one processor, further cause the system to:
 perform, using a beamformer component, delay-and-sum processing on the first data and the second data to generate the third data.

17. The system of claim 11, wherein the memory further comprises instructions that, when executed by the at least one processor, further cause the system to:
 apply a first filter to the first data to generate fifth data;
 apply the first filter to the second data to generate sixth data;
 generate seventh data using the fifth data and the first audio data;
 generate eighth data using the sixth data and the third fourth audio data; and
 perform, using a beamformer component, minimum variance distortionless response (MVDR) processing on the seventh data and the eighth data to generate the third data.

18. The system of claim 11, wherein the memory further comprises instructions that, when executed by the at least one processor, further cause the system to:
 generate sixth audio data by multiplying the second audio data and the portion of the first impulse response data; and
 generate the third audio data by subtracting the sixth audio data from the second audio data.

19. The system of claim 11, wherein the first audio data corresponds to a frequency range that is above an upper limit of a human hearing range.

20. The system of claim 11, wherein the memory further comprises instructions that, when executed by the at least one processor, further cause the system to:
 determine, based on the fourth data, first parameters associated with an audio processing component of the device;
 receive sixth audio data;
 generate, by the audio processing component using the first parameters and the sixth audio data, seventh audio data; and
 send the seventh audio data to the loudspeaker.

* * * * *